United States Patent
Stevens et al.

(10) Patent No.: US 9,749,442 B2
(45) Date of Patent: *Aug. 29, 2017

(54) BANDWIDTH RESERVATION FOR AUTHENTICATED APPLICATIONS

(71) Applicant: Qwest Communications International Inc., Denver, CO (US)

(72) Inventors: Gilman R. Stevens, Fairview, TX (US); Charles I. Cook, Louisville, CO (US); Thomas Schwengler, Lakewood, CO (US)

(73) Assignee: Qwest Communications International Inc., Denver, CO (US)

( * ) Notice: Subject to any disclaimer, the term of this patent is extended or adjusted under 35 U.S.C. 154(b) by 660 days.

This patent is subject to a terminal disclaimer.

(21) Appl. No.: 14/160,289

(22) Filed: Jan. 21, 2014

(65) Prior Publication Data
US 2014/0136716 A1    May 15, 2014

Related U.S. Application Data

(60) Division of application No. 12/967,863, filed on Dec. 14, 2010, now Pat. No. 8,667,111, which is a
(Continued)

(51) Int. Cl.
*G06F 15/173* (2006.01)
*H04L 29/08* (2006.01)
(Continued)

(52) U.S. Cl.
CPC ........ *H04L 67/322* (2013.01); *H04L 41/5003* (2013.01); *H04L 41/5045* (2013.01);
(Continued)

(58) Field of Classification Search
CPC    H04L 67/322; H04L 41/5003; H04L 41/5096
(Continued)

(56) References Cited

U.S. PATENT DOCUMENTS

| 6,091,725 A | 7/2000 | Cheriton et al. |
| 6,798,776 B1 | 9/2004 | Cheriton et al. |

(Continued)

OTHER PUBLICATIONS

Burris, Shaun, "Effects of Real-Time Traffic Prioritization in Home Based Broadband Internet Connections," Centre for Advanced Internet Architecture, Swinburne University of Technology, Feb. 15, 2008, 7 pages.

(Continued)

*Primary Examiner* — Philip B Tran
(74) *Attorney, Agent, or Firm* — Swanson & Bratschun, L.L.C.

(57) ABSTRACT

Methods, systems, devices, and software are disclosed for providing application levels of service over a network. Embodiments of the invention maintain a list of registered applications (or application providers) that have registered with a network resources provider. Customers of the network resources provider may authenticate some or all of the registered applications, indicating a desire to allow traffic relating to those applications over their access networks. Customers may further set application levels of service with respect to those authenticated applications. Certain embodiments may manage network traffic to accord with the application levels of service.

20 Claims, 12 Drawing Sheets

Related U.S. Application Data continuation of application No. 12/144,727, filed on Jun. 24, 2008, now Pat. No. 7,877,496, which is a continuation-in-part of application No. 12/128,841, filed on May 29, 2008, now Pat. No. 7,877,495.

(51) Int. Cl.
  *H04L 12/24* (2006.01)
  *H04L 12/725* (2013.01)
  *H04L 29/06* (2006.01)

(52) U.S. Cl.
  CPC ........ *H04L 41/5096* (2013.01); *H04L 45/302* (2013.01); *H04L 45/306* (2013.01); *H04L 45/308* (2013.01); *H04L 67/327* (2013.01); *H04L 69/14* (2013.01); *Y02B 60/33* (2013.01)

(58) Field of Classification Search
  USPC .................................................. 709/226, 223
  See application file for complete search history.

(56) References Cited

U.S. PATENT DOCUMENTS

| | | | |
|---|---|---|---|
| 7,545,752 B2 | 6/2009 | Krautkremer et al. | |
| 7,680,922 B2 | 3/2010 | Rabinovitch et al. | |
| 7,788,386 B2 | 8/2010 | Svensson | |
| 7,877,495 B2 | 1/2011 | Stevens et al. | |
| 7,877,496 B2 | 1/2011 | Stevens et al. | |
| 8,667,111 B2 * | 3/2014 | Stevens ............... | H04L 41/5003 709/226 |
| 2004/0203658 A1 | 10/2004 | Narayanan | |
| 2004/0246895 A1 | 12/2004 | Feyerabend | |
| 2005/0165925 A1 | 7/2005 | Dan et al. | |
| 2005/0286495 A1 | 12/2005 | Menon et al. | |
| 2007/0104208 A1 | 5/2007 | Svensson | |
| 2007/0106808 A1 | 5/2007 | Vemula et al. | |
| 2007/0263541 A1 | 11/2007 | Cobb et al. | |
| 2009/0097490 A1 | 4/2009 | Sanderson et al. | |

OTHER PUBLICATIONS

U.S. Appl. No. 12/128,841, Issue Notification dated Jan. 5, 2011, 1 page.

U.S. Appl. No. 12/128,841, Notice of Allowance dated Sep. 20, 2010, 24 pages.

U.S. Appl. No. 12/144,727, Issue Notification dated Jan. 5, 2011, 1 page.

U.S. Appl. No. 12/144,727, Notice of Allowance dated Sep. 16, 2010, 32 pages.

U.S. Appl. No. 12/967,863; Issue Notification dated Feb. 12, 2014; 1 page.

U.S. Appl. No. 12/967,863; Non-Final Rejection dated May 31, 2013; 20 pages.

U.S. Appl. No. 12/967,863; Non-Final Rejection dated Jul. 19, 2013; 12 pages.

U.S. Appl. No. 12/967,863; Notice of Allowance dated Oct. 25, 2013; 25 pages.

U.S. Appl. No. 12/967,863; Requirement for Restriction/Election dated Jan. 4, 2013; 13 pages.

* cited by examiner

BANDWIDTH RESERVATION FOR AUTHENTICATED APPLICATIONS

CROSS REFERENCES

This application is a divisional of U.S. application Ser. No. 12/967,863 filed Dec. 14, 2010 by Gilman R. Stevens et al. and entitled, "Bandwidth Reservation for Authenticated Applications", which is a continuation of U.S. application Ser. No. 12/144,727 (Now U.S. Pat. No. 7,877,496) filed Jun. 24, 2008 by Gilman R. Stevens et al. and entitled, "Bandwidth Reservation for Authenticated Applications", which is a continuation-in-part of U.S. Application Ser. No. 12/128,841 (Now U.S. Pat. No. 7,877,495) filed May 29, 2008 by Gilman R. Stevens et al. and entitled "APPLICATION LEVELS OF SERVICE OVER A NETWORK", the entire disclosures of each is herein incorporated by reference for all purposes.

BACKGROUND

Embodiments of the invention are related to the provision of telecommunication services, and in particular, to the provision of application levels of service over a network.

Many typical networks, including the Internet, may be configured as "best effort" networks. In a best effort network, each packet of information may be given substantially equal priority, such that the network may make a best effort to transmit each packet, regardless of the application from which the packet originates. This may allow a network to remain neutral to and compatible with any potential applications with which it may be used.

One result of using "best effort" protocols may be that applications may effectively "hog" limited bandwidth resources by sending and/or receiving large numbers of packets over the network. This may starve other applications of bandwidth, thereby preventing those other applications from running as desired. For example, voice over internet protocol ("VoIP") services may not run reliably while bandwidth-hogging applications (e.g., massively multiplayer online games, certain file sharing applications, etc.) are running over the same network.

Some network components (e.g., routers, residential gateways, and modems) attempt to provide certain applications minimum levels of service by allowing port-level configurations. In certain components, specific ports may be designated to send and/or receive certain types of packets and to prioritize those packets, such that a minimum level of service is maintained for those packets where possible. For example, a logical port on a router may be configured to send and receive VoIP packets with a very high priority. In this way, the router may attempt to establish a minimum level of service to VoIP packets, thereby indirectly attempting to establish a minimum level of service to any applications that send and/or receive VoIP packets.

While port-level configuration may help provide levels of service to certain types of packets, its effectiveness may be limited. One potential limit to the effectiveness of port-level configuration is that users may wish to give different levels of service to different applications using similar types of packets. If the port is configured only to detect that type of packet, there may be no way for the port to discriminate at the application level.

Another potential limit to the effectiveness of port-level configuration is that applications may easily "spoof" a network to exploit the configuration without the consent of a user. For example, massively multiplayer online games may use large amounts of bandwidth, even while the game does not appear to be running, to execute heuristics to predict future player movements, to update the game with networked information from other players and systems, to preload graphics and/or audio, etc. The game may then query a router configuration, determine that VoIP packets are being given high priority, and configure its packets to look like those high-priority VoIP packets. In this way, game traffic may look to the network like VoIP traffic, potentially starving actual VoIP traffic of bandwidth.

As such, there may be a general need in the art for providing reliable minimum application levels of service to network users.

BRIEF SUMMARY

Among other things, embodiments of the invention include methods, systems, and apparatuses for providing reliable minimum application levels of service to network users.

In one embodiment, an access network is provided over which levels of service are set on a per application basis. Certain applications register with a provider of network services over the access network to become registered applications. A consumer of the network services may authenticate certain of the registered applications, such that the applications become authenticated applications with respect to the consumer. The network services provider and/or the consumer may then set service level settings for handling network traffic relating to registered and/or authenticated applications.

One set of embodiments includes a system for providing an application level of service over a network. The system includes a receiver unit, operable to receive network traffic, wherein the network traffic includes application data relating to an application and protocol data, and is configured to be sent over the network to an intended consumer, the intended consumer being a consumer of network resources provided by a service provider. The system also includes a parser unit, operable to derive the application and the intended consumer from the network traffic at least in part as a function of the protocol data. The system further includes a traffic management unit, operable to: determine whether an application registration relationship exists between the application and the service provider such that the application is a registered application; determine, when the application is a registered application, whether an application service level relationship exists between the registered application and the intended consumer, wherein the application service level relationship defines at least one traffic handling criterion; and formulate, when the application service level relationship exists, traffic handling instructions as a function of the traffic handling criterion. The system even further includes a routing unit, operable to route at least a portion of the network traffic over a communication link as a function of the traffic handling instructions.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
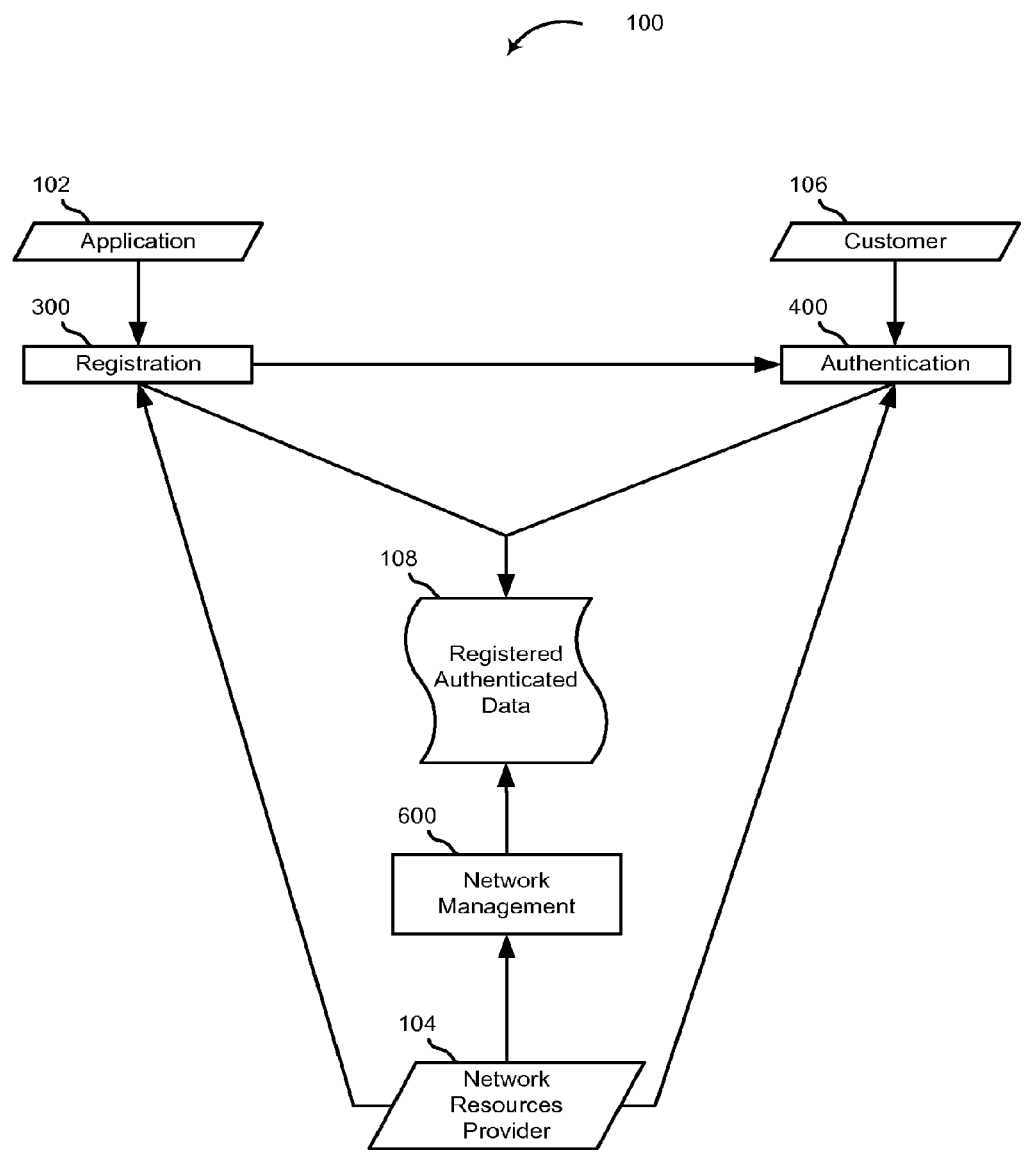
FIG. 1 shows a simplified data flow diagram for providing application levels of service ("ALS") over a network, according to various embodiments of the invention.

Embodiments of the invention provide reliable minimum application levels of service to network users. Various embodiments provide methods, systems, and apparatuses for providing such services through application authentication protocols. Using application authentication protocols may allow participants to reliably handle levels of service at the application or sub-application level.

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

Further, while various embodiments are described with reference to the Internet, embodiments of the invention may be implemented in any network.

Many typical networks, including the Internet, may be configured as "best effort" networks. In a best effort network, each packet of information may be given substantially equal priority, such that the network may make a best effort to transmit each packet, regardless of the application from which the packet originates. On one hand, this may allow a network to remain neutral to and compatible with any potential applications with which it may be used. In general, much Internet policy has been concerned with maintaining this so-called network neutrality over the public Internet.

On the other hand, some types of information may be more sensitive than others to network resource limitations, like limited bandwidth and delays. For example, quality of service ("QoS") for some voice over internet protocol ("VoIP") applications may be impacted by network characteristics, like latency, jitter, and packet loss. In certain of these applications, where information is communicated in multiple directions (e.g, in a two-way communication), the impacts may be experienced on both the uplink and downlink channels of the network link. As such, ensuring levels of service (e.g., QoS) for certain applications may be difficult in a best effort network like the Internet.

Moreover, some modern applications have found ways to exploit the best effort nature of the Internet and other networks to effectively "hog" limited bandwidth resources. In some cases bandwidth may be hogged simply by sending and/or receiving large numbers of packets over a network. This may starve other applications of bandwidth, thereby preventing those other applications from running as desired. For example, voice over internet protocol ("VoIP") services may not run reliably while bandwidth-hogging applications (e.g., massively multiplayer online games, certain file sharing applications, etc.) are running over the same network.

Some network components (e.g., routers, residential gateways, and modems) attempt to provide certain applications minimum levels of service by allowing port-level configurations. For example, a logical port on a router may be configured to send and receive packets designated by a VoIP header with a very high priority. In this way, the router may attempt to tilt levels of service in favor of VoIP packets, at least from the router to the next network switch or router.

While port-level configuration may help provide levels of service to certain types of packets, its effectiveness may be limited. One potential limit to the effectiveness of port-level configuration is that users may wish to give different levels of service to different applications using similar types of packets. If the port is configured only to detect that type of packet, there may be no way for the port to discriminate at the application level.

Another potential limit to the effectiveness of port-level configuration is that applications may easily "spoof" a network to exploit the configuration without the consent of a user. For example, a massively multiplayer online game may desire to use large amounts of bandwidth, even while the game does not appear to be running, to execute heuristics to predict future player movements, to update the game with networked information from other players and systems, to preload graphics and/or audio, etc. The game may query a router configuration (e.g., by locally or remotely detecting port settings), determine that packets with VoIP headers are being given high priority, and configure its packets to include VoIP information in the headers so as to look like those high-priority VoIP packets. In this way, game traffic may appear to be VoIP traffic from the router's standpoint, potentially starving actual VoIP traffic of bandwidth. As such, it may be desirable to provide levels of service for application-level network traffic, while limiting the ability of applications to spoof the network.

It will be appreciated that the phrase "application level of service" and its acronym "ALS" may be used herein to refer generally to any type of network service level metric. For example, ALS may refer to bandwidth reservation, quality of service ("QoS"), class of service ("CoS"), or terms of service ("ToS"). Further, providing ALS over a network may refer to providing minimum, maximum, adjustable, specific, or any other type of levels of service to applications. Even further, providing ALS may include providing levels of security along with the various other ALS functions. For example, bandwidth reservation may include securely reserving bandwidth by application.

It will be further appreciated that, while various embodiments are illustrated with application data flowing from an application to an intended end user, the same or similar inventive concepts described herein are applicable to any other data flows throughout a network. For example, similar functionality may be applicable to handling applicant data sent from an end user to an application provider, from one network component to another network component (e.g., one aggregator to another aggregator), etc. Further, it may be desirable to handle multidirectional data flows for certain applications (e.g., both upstream and downstream data traffic for a VoIP call). Even further, embodiments of the invention may be used in the context of peer-to-peer networks, mesh networks, and other networks in which application data is flowing from one user of the network to another. As such, descriptions of data flows from applications to end users should not be construed as limiting the scope of the invention.

Among other things, embodiments of the invention provide methods, systems, apparatuses, and software for handling ALS over a network, while minimizing network spoofing and/or other network management and design issues. FIG. 1 shows a simplified data flow diagram for providing ALS over a network, according to various embodiments of the invention. The data flow 100 includes a registration process 300, an authentication process 400, and network management processes 600.

In some embodiments, the data flow 100 begins when an application 102 goes through a registration process 300 to become a registered application. In certain embodiments, the registration process 300 is provided by, controlled, and/or performed with a network resources provider 104. The application 102 may be any type of application that communicates application data (e.g., streaming data, real-time data, files, cached data, etc.) to an end user over a network. For example, the application 102 may relate to email, online gaming, VoIP, file sharing, e-commerce, Internet protocol television ("IPTV"), or any other network usage.

Some time after the application 102 completes the registration process 300, a customer 106 may perform an authentication process 400 to authenticate the application 300. In certain embodiments, the registration process 300 is provided by, controlled, and/or performed with a network resources provider 104. The customer 106 may be a customer of the network resources provider 104 (e.g., the network resources provider 104 may provide network services to the customer 106). By completing the authentication process 400, the application 102 may become authenticated.

This may indicate to the network (e.g., to the network resources provider 104) that the customer 106 desires to receive network traffic from the application 102 at a certain ALS (e.g., greater than some minimum QoS). This network traffic may then be treated as registered authenticated data 108 as it flows through all or a portion of the network. It will be appreciated that some or all of the registration and/or authentication processes may include security. For example, it may be desirable to provide secure registration of applications or secure authentication of securely registered applications.

In some embodiments, the network resources provider 104 constantly performs network management processes 600. These network management processes 600 may include handling (e.g., routing) of various types of network traffic. In certain embodiments, the network management processes 600 include processes for handling the registered authenticated data 108 according to various conditions. The conditions may include information from the registration and/or authentication processes, network characteristics, time of day, multiple applications competing for network resources, etc.

By handling the registered authenticated data 108 with specific network management processes 600, it may be possible to prevent unregistered or unauthenticated applications 102 from spoofing the network. For example, even a registered application 102 may be unable to send data to a customer 106 at a certain ALS without first being authenticated by the customer 106. As such, it will be appreciated that the data flow 100 may provide customers 106 with the capability to set ALS for desired applications 102, while limiting the ability of undesired applications 102 to spoof the network.

Figure 2:
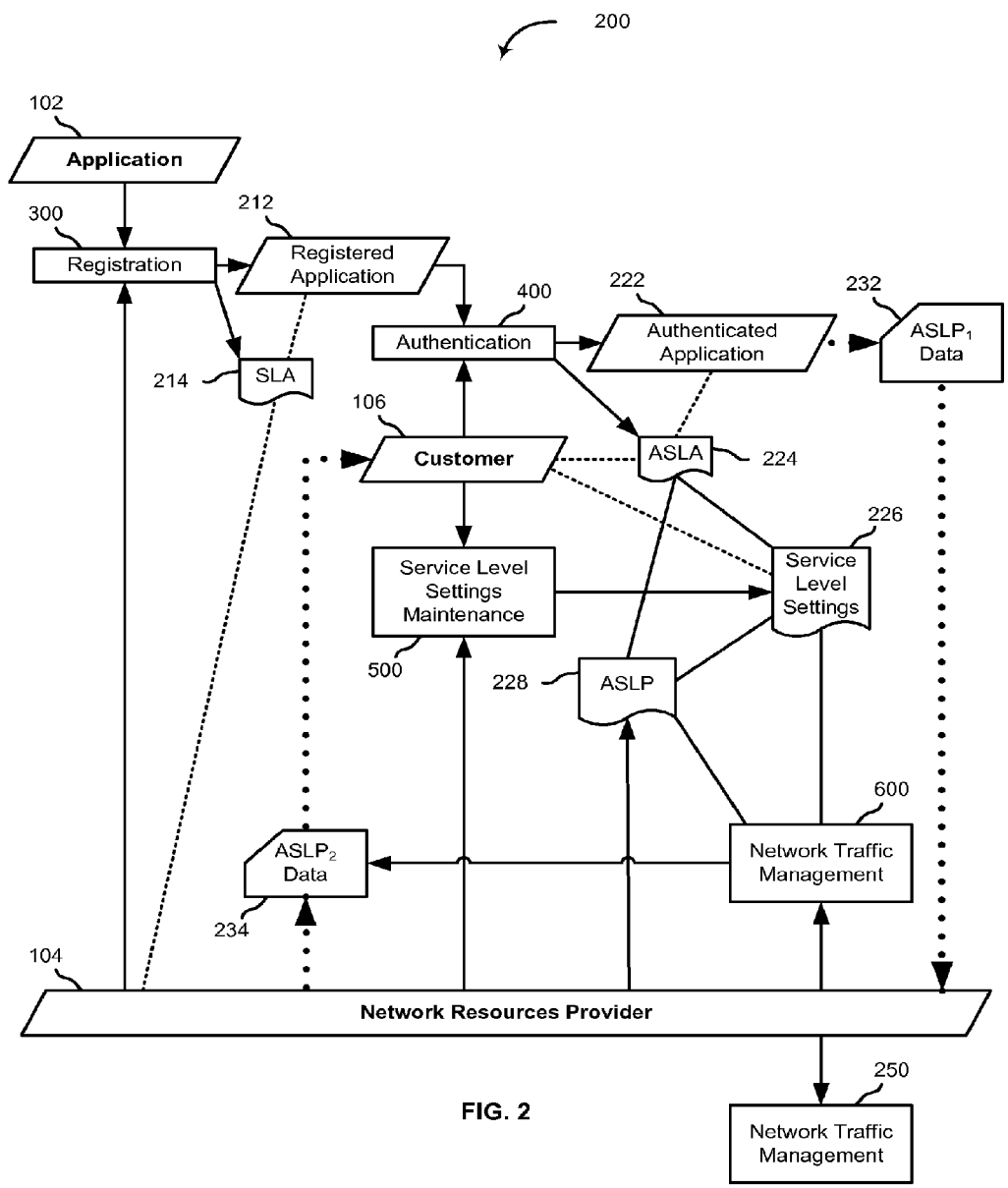
FIG. 2 shows another data flow diagram for providing ALS over a network, according to various embodiments of the invention.

FIG. 2 shows a more detailed embodiments of a data flow diagram for providing application levels of service over a network, according to various embodiments of the invention. As in FIG. 1, the data flow 200 includes a registration process 300, an authentication process 400, and network management processes 600. Dashed lines may indicate illustrative parties to an agreement, and solid lined with no arrowheads may indicate illustrative data usage by a process.

Embodiments of the data flow 200 begins when an application 102 completes a registration process 300 to become a registered application 212. In certain embodiments, the registration process 300 is provided by, controlled, and/or performed with a network resources provider 104. In various embodiments, the registration process 300 may be performed at the application level, application type level (e.g., voice communications, file sharing, online gaming, IPTV, etc.), application provider level, sub-application level (e.g., the heuristics or video pre-loading modules of an online gaming application), or any other useful level. For example, an application provider may register some or all of its applications, or an application may register some or all its sub-applications.

Figure 3:
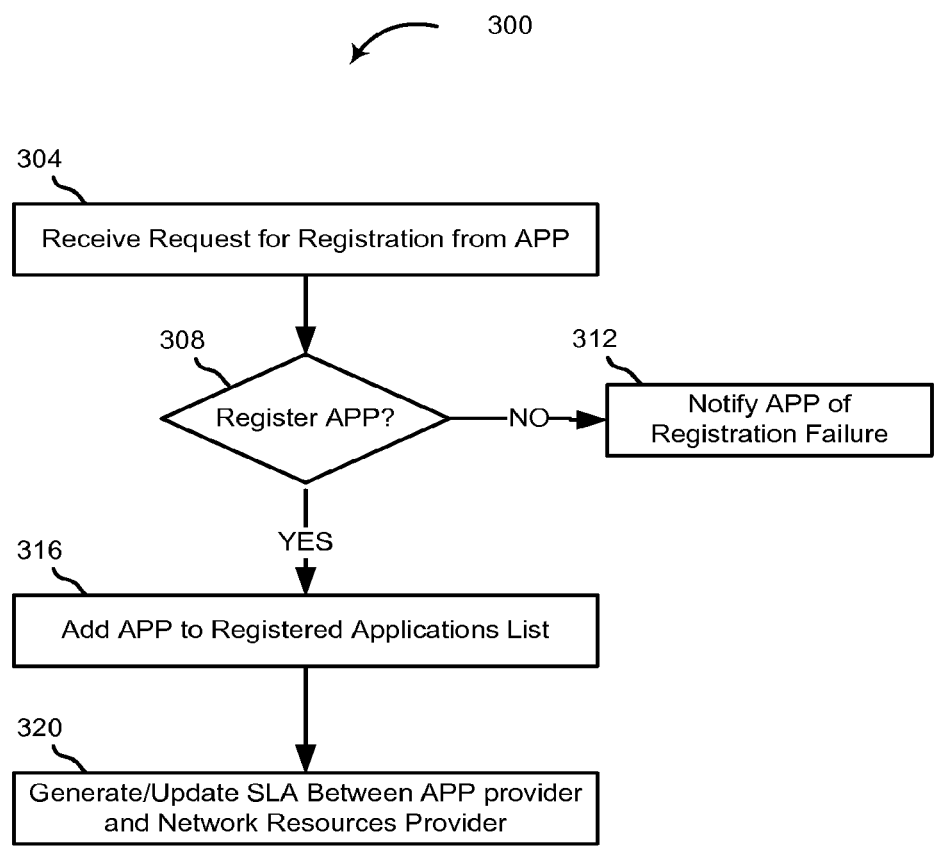
FIG. 3 shows an illustrative embodiment of a registration process, according to various embodiments of the invention.

FIG. 3 shows an illustrative embodiment of a registration process 300, according to various embodiments of the invention. Embodiments of the registration process 300 begin at block 304 when an application requests to become a registered application. In some embodiments, the application provider submits a registration request to a network resources provider, for example, electronically or by mail. In certain embodiments, a registration network portal is provided to allow applications or application providers to register electronically over the network (e.g., the Internet).

The registration request received at block 304 may succeed or fail at block 308. Where the registration fails, some embodiments of the registration process 300 notify the application of the registration failure at block 312. In some cases, the registration failure may result from a denial of the registration request. For example, the network resources provider may determine that the application tends to overuse or misuse certain network resources, or that it would be undesirable or unprofitable to register the application for some reason (e.g., for competitive reasons). In other cases, the failure may relate to network constraints or failures, account issues, or other reasons.

Where the registration succeeds, the application may be approved as a registered application. In some embodiments, the registered application is added to a list of registered applications in block 316. The list of registered applications may be maintained, for example, in a data storage unit (e.g., a server). In certain embodiments, the list of registered applications is maintained by the network resources provider.

In certain embodiments, the registration process 300 continues at block 320 with updating or generating a service level agreement ("SLA"). In some embodiments, the SLA is generated to control one or more aspects of the relationship between the application provider and a third party service provider, like the network resources provider. For example, the application may register with a party responsible for a number of access network (e.g., "last mile") connections between end customers and a first network access point. In one embodiment, the registration request received at block 304 is not approved at block 308 until the terms of an SLA have been agreed to by its parties (e.g., the application provider and the network resources provider).

Returning to FIG. 2, it will now be appreciated that embodiments of the registration process 300 (e.g., the registration process 300 of FIG. 3) may allow the application 102 to become a registered application 212. It will be further appreciated that embodiments of the registration process 300 may generate or update an SLA 214 between the now-registered application (or the application provider) and the network resources provider 104. In this way, the registration process 300 may be used to effectively certify the application 102 as a trusted application.

Figure 4:
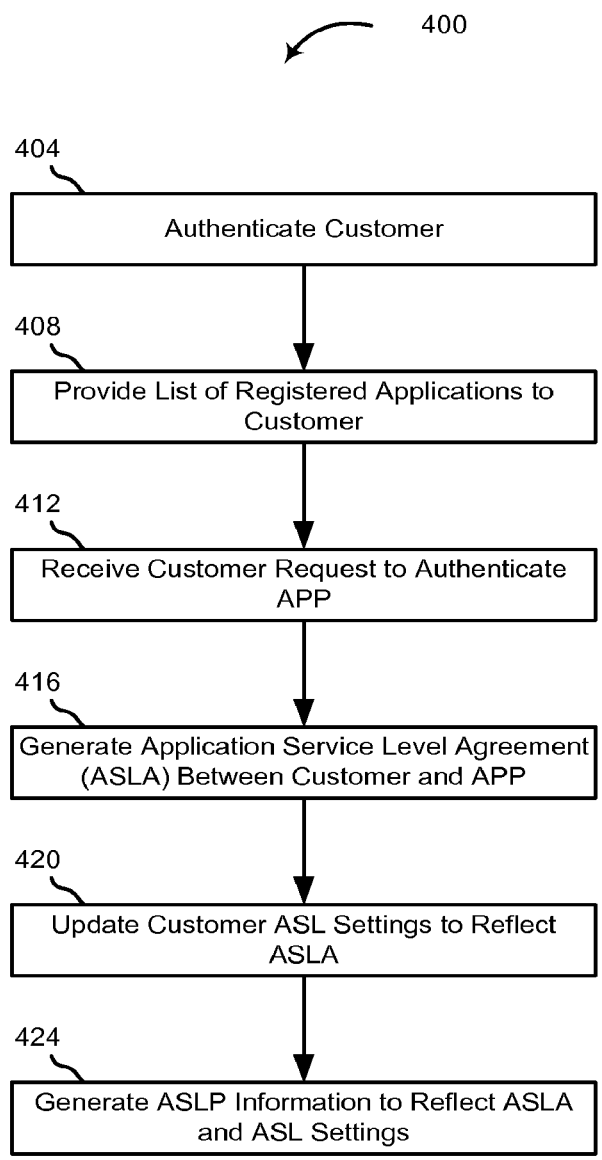
FIG. 4 shows an illustrative embodiment of an authentication process, according to various embodiments of the invention.

Even where the application 102 is a registered application 212, it may be desirable for the customer 106 to be able to set a certain ALS and/or other service level settings relating to the registered application 212. In some embodiments of the data flow 200, the customer 106 engages in an authentication process 400 to authenticate the registered application 212 as an authenticated application 222. FIG. 4 shows an illustrative embodiment of an authentication process 400, according to various embodiments of the invention.

Some embodiments of the authentication process 400 begin at block 404 by authenticating the customer. In certain embodiments, the authentication process 400 receives login information from the customer, allowing the customer access to certain customer account information. For example, the authentication process 400 may be provided via a network portal (e.g., over the Internet), which requires an account identifier (e.g., a user name) and a password.

Once the customer is authenticated, embodiments of the authentication process 400 provide the customer with a list of registered applications at block 408. It will be appreciated that the list may be provided in any useful way. In one embodiment, the list is provided as a table, the table showing all the available registered applications and associated relevant information (e.g., whether the application has been previously authenticated, a description of the application, a description of the applications network usage, etc.). In another embodiment, the customer is provided with the capability to process (e.g., search, sort, filter, etc.) the list, such that records from the list are provided as processed results. For example, the customer may search for all home-office-related applications that have not been registered, sorted by customer rating. In still another embodiment, preset configurations may be offered as choices for the customer, allowing the customer to make macro-level ALS decisions. For example, the customer may choose a "home-office" profile that has been predefined (e.g., by the customer, the network resources provider, an application provider, the customer's employer, etc.) to simultaneously authenticate multiple applications with particular ALSs and other service level settings.

In some embodiments, the authentication process 400 continues at block 412 by receiving a customer request to authenticate one or more applications. It will be appreciated that the request may be received in a number of ways according to the invention. In one embodiment, the request is received electronically via the provided network portal. In other embodiments, the request is received electronically by some other way (e.g., email) or by mail. Further, the receipt of the request may relate to the form in which the list of registered applications was provided in block 408. For example, where the customer is provided with macro-level options, the request may be received as a macro-level request (e.g., to authenticate multiple applications in one request).

In some embodiments, authentication request in block 412 results in updating or generating an application service level agreement ("ASLA") between the customer and the application or application provider at block 416. The creation of the ASLA may include generating a set of ASLA terms and conditions or other elements of the agreement. In some embodiments, the ASLA includes minimal information, for example, the parties to the agreement. In other embodiments, the ASLA further includes certain service level settings relating to the application (e.g., service level settings). In one example, the service level settings indicate that traffic relating to the customer's VoIP provider should receive the highest priority of all network traffic on the customer's access network at all times of day. In another example, the service level settings indicate that traffic relating to the customer's VoIP provider should be guaranteed a minimum QoS at all times.

Some embodiments of the ASLA provide an individualized ASLA for each customer-application pair. In other embodiments, the ASLA is implemented as one or more records in a relational database. For example, a data record may exist for each customer, including attributes relating to which applications have been authenticated by the customer, other service level settings, etc. Alternately, a data record may exist for each registered application, including attributes relating to which customers have authenticated the application. It will be appreciated that many types of SLAs and ASLAs are possible according to the invention. In fact, various embodiments of the invention may support any type of multilateral agreement process by which a customer may authenticate an application. In some embodiments, the agreement are bilateral (e.g., through an ASLA); in other embodiments, the agreements are trilateral (e.g., by combining the third-party registration and SLA process with the ASLA); and in still other embodiments, various SLAs and ASLAs are combined to create multilateral agreements (e.g., by combining an SLA between a two network service providers with an SLA between one of the network service providers and an application provider and further with an ASLA between the application provider and a customer.

In some embodiments of the authentication process 400, other service level settings are received at block 420. For example, the customer may have service level settings which are or are not related to specific ASLAs. Some or all of the information from the ASLA and/or other service level settings may be used in block 424 to generate or update application service level protocol ("ASLP") information. It will be appreciated that network traffic may generally be configured according to one or more protocols (e.g., the TCP/IP protocol). These protocols may essentially handle (e.g., control) the communication of information between nodes of the network by defining and interpreting certain rules understood by those nodes. The rules may relate, for example, to syntax, encryption, synchronization, error correction, etc. The ASLP refers to a protocol for providing application levels of service over a network.

It will be appreciated that the term "protocol" as used herein is intended to generally describe any set of data useful for facilitating data handling over a network. In some embodiments, the ASLP is compatible with standard network protocols. In one embodiment, the ASLP is compatible with the TCP/IP protocol, a standard Internet protocol. The TCP/IP protocol may generally include a header portion, a data portion, and a tail portion. The header portion may include space that is reserved for certain information (e.g., error correction bits), and other space that is open for certain optional information. In the optional information space, it may be possible to include ASLP bits for handling application service levels.

In another embodiment, the ASLP bits are incorporated into data portions of other datagrams. For example, a standard network protocol may include a data portion for communicating application data. Within the data portion, it may be desirable to insert another datagram. In one embodiment, the ASLP defines the bit string in the data portion of an IP datagram. For example, the first twenty-four bits of the data portion may include bits representing the application provider and/or the intended user or consumer.

In yet another embodiment, the ASLP bits may be inferred from network traffic (e.g., from data signatures within a data packet). For example, techniques, like those used in deep packet inspection, may be used to guess at a likely source application for data traffic on the network. The techniques may, for example, analyze patterns of data looking for patterns that are characteristic to certain applications, or look for source-identifying data inserted into the traffic by the application (e.g., for trademark, branding, copyright, tracking, or other reasons).

Returning to FIG. 2, it will now be appreciated that embodiments of the authentication process 400 (e.g., the authentication process 400 of FIG. 4) may allow the registered application 212 to become an authenticated application 222. It will be further appreciated that embodiments of the authentication process 400 may generate or update an ASLA 224 between the now-authenticated application (or the application provider) and the customer 106, generate or update other service level settings 226 relating to the customer's network management, and generate or update ASLP 228 information for use in handling network traffic between the application 102 and the customer 106. As such, a relationship may now be defined that effectively certifies the application 102 from the standpoint of both the customer 106 and the network resources provider 104.

Some embodiments of the data flow 200 include a service level settings maintenance process 500 that is separate from the authentication process 400. Some embodiments of the service level settings maintenance process 500 allow the network resources provider 104 to modify service level settings 226 for a customer 106. For example, the network resources provider 104 may upgrade certain options, provide different functionality based on account changes, provide different functionality based on network infrastructure changes, or modify the service level settings 226 of the customer 106 for any other reason. Other embodiments of the service level settings maintenance process 500 allow the customer 106 to access and/or change its own service level settings 226.

Figure 5:
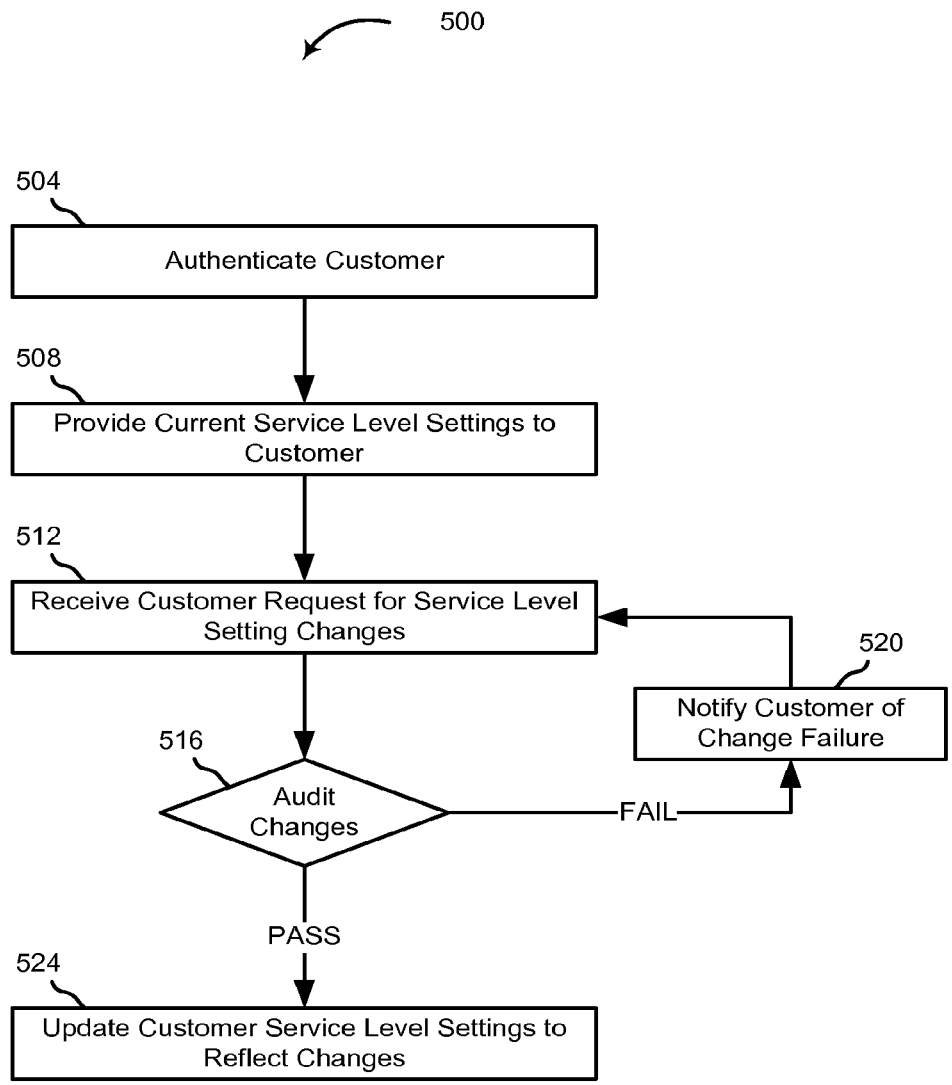
FIG. 5 shows an illustrative embodiment of a customer-initiated service level settings maintenance process, according to various embodiments of the invention.

FIG. 5 shows an illustrative embodiment of a customer-initiated service level settings maintenance process 500, according to various embodiments of the invention. It is worth noting that a customer's service level settings may be stored and/or implemented in a number of ways. In some embodiments, the service level settings include data stored on a data storage device that may be queried by one or more components of the network. For example, a DSLAM may query the data storage device to determine whether the customer has set priorities relating to a particular application. In other embodiments, the service level settings may include physical or virtual settings of network components. For example, the service level settings may include port settings for a customer's home router. In certain of these embodiments, the customer service level settings can be handled (e.g., updated, modified, etc.) remotely. For example, a network resources provider may control service level settings relating to a customer's DSL modem using an automatic configuration server ("ACS") by transmitting information over the access network (e.g., TR-069 commands).

Embodiments of the service level settings maintenance process 500 begin at block 504 by authenticating the customer (e.g., in a similar way to the authentication of the customer in block 404 of FIG. 4. For example, a network portal may be provided for performing the service level settings maintenance process 500, which receives a login identifier and password to authenticate the customer. In some embodiments, the customer's current service level settings are provided to the customer at block 508. In some cases, for example where the customer has never modified its service level settings, the service level settings provided to the customer may include default service level settings. In one embodiment, the default service level settings are set by the network resources provider. In various embodiments, some service level settings may relate to specific ASLAs, while other service level settings may not be related to specific ASLAs. For example, the customer's service level settings may relate to the customer's account (e.g., payment history, account restrictions, content entitlement, maximum bandwidth allocations, etc.), the customer's network characteristics (e.g., a measured level of latency, traffic, usage, etc.; customer premises equipment settings and capabilities; customer intranet settings; etc.), the customer's preferences (e.g., what types of applications the customer prefers, at what times of day the customer uses them, etc.); or any other useful type of service level setting.

The service level settings maintenance process 500 may then receive a request from the customer at block 512 to modify its current service level settings. In one example, a customer homeowner may set its service level settings to allocate certain amounts of bandwidth to certain types of applications at certain times of day. During the homeowner's workday (e.g., from nine o'clock each morning until four o'clock each afternoon), the service level settings indicate that certain home-office applications receive the largest relative bandwidth allocation in the access network. From four o'clock until six o'clock each afternoon, when the homeowner's children return home from school, their favorite multiplayer online game receives the largest relative bandwidth allocation in the access network. From six o'clock until midnight each evening, when the homeowner's family tends to watch television together, traffic from a number of IPTV applications receive the largest relative bandwidth allocation in the access network. At all other times of day, the service level settings provide default bandwidth allocations to all applications (e.g., the network is treated as a best effort network, is managed according to a default or preset profile, or is managed based on some other heuristic).

In certain embodiments, the request for changes to the service level settings received at block 512 is audited at block 516 to determine whether the request is proper. In one embodiment, the audit analyzes the form of the request to determine whether it may be accurately interpreted by the service level settings maintenance process 500. In another embodiment, the content of the request is audited to determine whether the request is possible according to certain network limitations (e.g., whether a requested bandwidth allocation exceeds the maximum bandwidth available to the customer, certain service level settings are incompatible with other service level settings, etc.). In still another embodiment, the content of the request is audited to determine whether it is compliant with certain account limitations (e.g., only a certain number of changes are allowed per day, only certain service level settings may be changed, etc.).

When the audit in block 516 fails, some embodiments of the service level settings maintenance process 500 notify the customer of the failure in block 520. When the audit in block 516 succeeds, some embodiments of the service level settings maintenance process 500 change the customer's service level settings in block 524 to reflect the customer's request (e.g., by updating information stored at a storage device or by sending commands from an ACS). In certain embodiments, the customer's request received at block 512 may be interpreted and/or modified by the service level settings maintenance process 500 to comply with certain parameters. This interpretation and/or modification of the request may be in addition to or in lieu of the auditing step at block 516. In one example, the service level settings maintenance process 500 parses a plain language request to generate a formatted request that may properly be audited at block 516 and/or carried out at block 524. In another example, the service level settings maintenance process 500 interprets a pattern of service level settings change requests to better generate certain heuristics.

Returning to FIG. 2, it will now be appreciated that embodiments of the service level settings maintenance process 500 (e.g., the service level settings maintenance process 500 of FIG. 5) may allow the customer 106 to maintain its service level settings 226. It will be further appreciated that certain embodiments of the ASLA 224, ASLP 228, and service level settings 226 may share information, be based on one another, or be related in any other useful way. In some embodiments of the data flow, some or all of the information in the ASLA 224, ASLP 228, and/or service level settings 226 may then be used in managing (e.g., routing, handling, etc.) network traffic between the application 102 and the customer 106 (e.g., as managed by the network resources provider 104).

Figure 6:
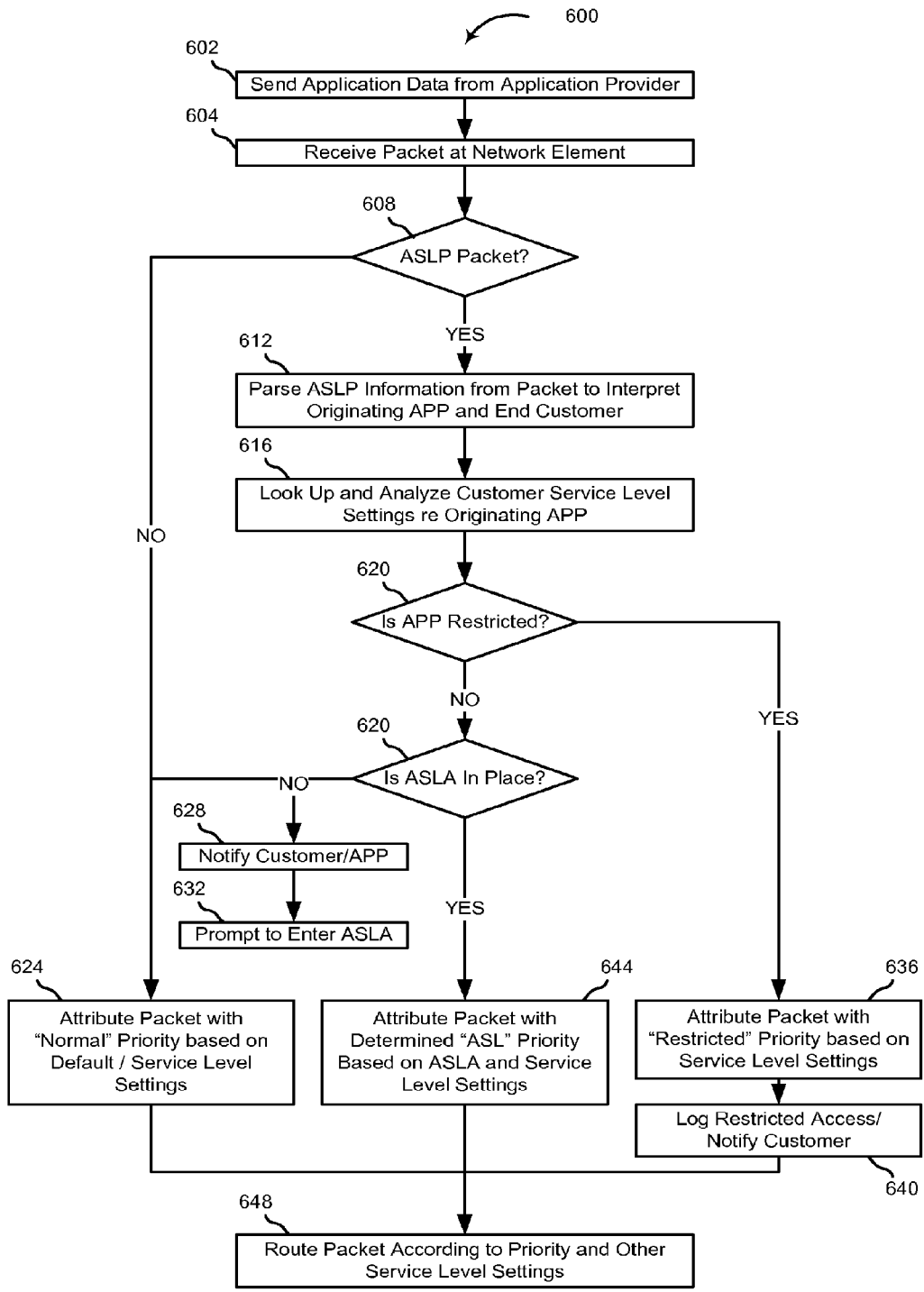
FIG. 6 shows an illustrative embodiment of a network traffic management process, according to various embodiments of the invention.

FIG. 6 shows an illustrative embodiment of a network traffic management process 600, according to various embodiments of the invention. While network management may be constantly occurring in a network, for clarity of description, embodiments of the network traffic management process 600 are considered to begin at block 602 when an application 102 begins transmitting application data to a customer 106 over a network. The data transmission may include configuring application data to be sent to the customer according to certain ASLP standards. In some embodiments, packets of application data are configured to include ASLP information, for example, in each packet's header.

The ASLP information may identify the originating application provider and the intended end customer of the application data. In some cases, the ASLP information may further identify one or more network resources providers (e.g., if that is important for managing data flow, tariffs, and other issues across a network involving multiple resource provider partners). In other cases, the ASLP information includes other types of information, for example, relating to terms and conditions of the ASLA with the intended end customer. In certain embodiments, the ASLP defines certain algorithms for generating the ASLP information. For example, the ASLP may require certain contents of a bit string, certain bit lengths for particular information, certain encryption algorithms, certain error correction algorithms, certain amounts of data redundancy, etc.

At block 604, the network traffic management process 600 receives the network traffic sent in block 602. For example, packets of information may be received at a network element or other network node (e.g., a switch, a DSLAM, a head-end, etc.). The network traffic management process 600 may then determine at block 608 whether the network traffic includes ASLP information (e.g., if the packet is compatible with the ASLP). In some embodiments, if the received traffic does not include ASLP information, the network traffic management process 600 will treat the traffic in some predetermined or default way at block 624. For example, the packet may be given "normal" or "default" priority. In other embodiments, non-ASLP traffic may be handled differently, for example, by being blocked, rerouted, tagged, given low priority, etc.

If the network traffic is determined at block 608 to include ASLP information, the ASLP information may be parsed, or otherwise processed, from the traffic at block 612.

Parsing the ASLP information from the data packets may allow the network traffic management process 600 to interpret its contents. For example, the interpretation may reveal the application provider from which the data packets originated and the intended customer to which the data packets are destined. In certain embodiments, the determination in block 608 may include a determination of whether the ASLP information is proper. For example, the ASLP information may be incorrect in content or syntax, potentially preventing reliable interpretation of the data.

It will be appreciated that the ASLP may be configured such that only registered applications could generate proper ASLP information (e.g., through encryption keys, etc.). As such, a determination that the ASLP information is improper may indicate that the originating application provider is not registered. As a corollary, in some embodiments, a determination that the ASLP information is proper may indicate that the originating application provider is registered.

In some embodiments, the interpreted information is used at block 616 to analyze what, if any, service level settings and/or agreements are in place with respect to the originating application provider. One possible service level setting includes whether an application is restricted. In certain embodiments, the network traffic management process 600 determines whether the application is a restricted application at block 620. In one embodiment, the network traffic management process 600 may determine that the originating application provider is not registered. Where the application is not registered, the network traffic management process 600 may treat the traffic in some predetermined or default way at block 624.

In another embodiment, network resources providers and/or the customers are provided with functionality to block or otherwise restrict traffic from certain types of application providers. As such, a determination that the application is restricted may require treating the application-related traffic in some restricted way. For example, a network resource provider may wish to block certain file sharing applications, either completely, at certain times of day, based on certain network conditions, after a certain quota of traffic has been reached, etc. In this and other examples, it may be desirable to restrict the application-related traffic, for example, by attributing packets with one or more "restricted" tags or priority settings at block 636. In certain embodiments, when traffic is identified as originating from a restricted application, the network traffic management process 600 logs certain events (e.g., records the restricted application's attempt to send information to the customer) and/or notifies the customer of the traffic at block 640. In one embodiment, notifying the customer includes giving the customer the option to remove or modify the restrictions.

In some embodiments of the network traffic management process 600, a determination is made at block 620 of whether an ASLA is in place between the originating application provider and the intended customer. Where no ASLA is in place, the network traffic management process 600 may treat the traffic in some predetermined or default way at block 624. In certain embodiments, when no ASLA is in place, the network traffic management process 600 logs certain events (e.g., records the traffic not under an ASLA) and/or notifies the customer or the originating application provider of the non-ASLA traffic at block 628. In other embodiments, when no ASLA is in place, the network traffic management process 600 gives the customer the option to enter into an ASLA (i.e., to authenticate the application) at block 632. Where a proper ASLA is in place, embodiments of the network traffic management process 600 determine the terms and conditions of the ASLA and any other service level settings at block 644, and attribute the traffic accordingly.

Once the ASLP information has been interpreted to determine the appropriate conditions for handling the network traffic, embodiments of the network traffic management process 600 then manage the network traffic according to those determinations in block 648. In some embodiments, the network traffic management process 600 is performed at a network element (e.g., a switch, a DSLAM, a router, etc.) controlled by a network resources provider. In certain of these embodiments, the packet of information is received at the network element with certain ASLP information and routed with different ASLP information. For example, an incoming data packet may include ASLP bits implemented as an encrypted bit string. The bit stream may contain information from which it is possible to verify or reconstruct the application from which the packet originated, the end customer to whom the packet is intended, and a portion of the data included in the packet. This information may be used, as described above, to determine how the traffic should be handled (e.g., whether an ASLA is in place). Based on the determination, new ASLP bits may be generated and incorporated into the data packet, indicating the proper rules for handling the data packet once the packet is received by the next network element (e.g., the customer's modem, residential gateway, or router). It will be appreciated that managing the traffic according to the ASLP at block 648 may include routing or re-routing data, blocking transmission of data, logging transmission of data, altering data, otherwise handling the data, etc.

Returning to FIG. 2, it will now be appreciated that embodiments of the network traffic management process 600 (e.g., the network traffic management process 600 of FIG. 6) may allow the network resources provider 104, or another party, to manage network resources with ALS provisions. As shown in FIG. 2, the authenticated application 222 may communicate data over the network having a first set of ASLP information (e.g., an encrypted bit string in the packet headers designating the originating application provider and the intended end customer), designated as $ASLP_1$ Data 232. The $ASLP_1$ Data 232 may, at some point in its network transmission, reach a network element (e.g., a network access point or switch) controlled by the network resources provider 104. Through the network traffic management process 600, the network resources provider 104 may interpret the $ASLP_1$ Data 232, determine appropriate data handling actions according to the ASLP, and generate data with a second set of ASLP information (e.g., an encrypted bit string in the packet headers indicating certain data handling commands for interpretation by the network element), designated as $ASLP_2$ Data 234. The $ASLP_2$ Data 234 may then be routed to the intended end customer 106, where and as appropriate. The $ASLP_1$ Data 232 and or the $ASLP_2$ Data 234 may be the registered authenticated data 108 of FIG. 1.

In some embodiments of the data flow 200, a billing management process 250 is included to handle various billing functions. In various embodiments, the billing functions may apply to any or all of the methods of FIGS. 3-6, or other billing relationships. In one embodiment, the billing management process 250 handles billing of applications for registration and use of the ASLP handling functionality of the data flow 200. In another embodiment, the billing management process 250 handles billing of customers for authentication of application data and for using the ASLP handling functionality of the data flow 200. In still other embodiments, the billing management process 250 handles billing of other network resources providers for performing ASLP handling functions (e.g., in the form of tariffs for data trafficking and/or shaping, licenses for using ASLP handling functions, maintenance fees for purchasing ASLP handling components and/or functionality, etc.). It will be appreciated that many other types of billing arrangements are possible, some or all of which may be handled by the billing management process 250. For example, other billing functionality may include billing for customer or application data handling (e.g., storage, retrieval, buffering, caching, processing, etc. of data relating to registration, authentication, ASLAs, SLAs, service level settings, etc.), billing for data routing (e.g., per packet, per type of packet, per logical pipe allocation, etc.), billing for certain service levels (e.g., types of functions available, number of levels available, types of guarantees available, etc.), or any other useful billing functions.

Figure 7:
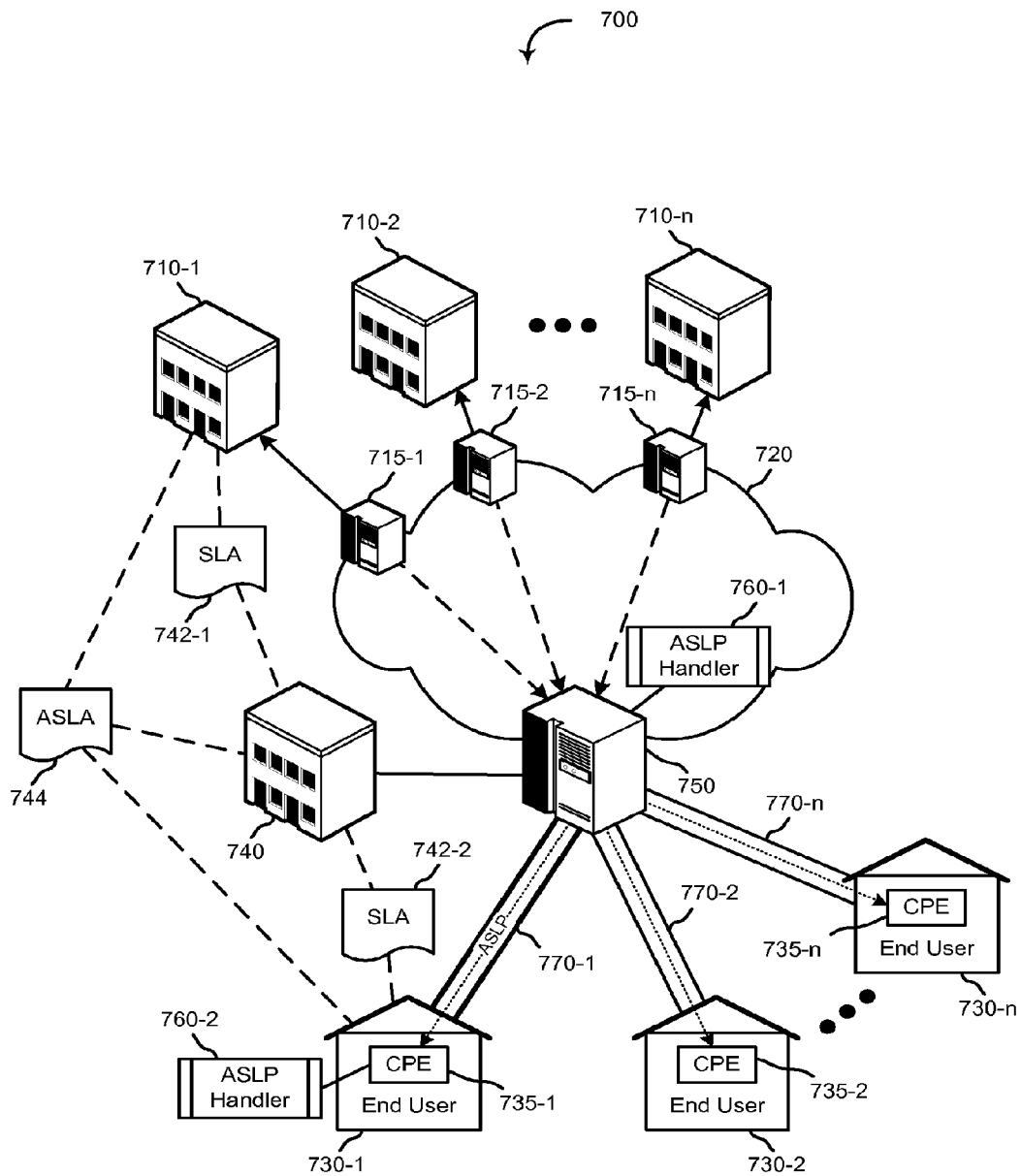
FIG. 7 shows a simplified system diagram of an illustrative system for providing ALS over a network, according to various embodiments of the invention.

It will be appreciated that embodiments of the invention, including the embodiments described with reference to FIGS. 1-6 may be implemented in various types of systems, apparatuses, and/or software. FIG. 7 shows a simplified system diagram of an illustrative system for providing ALS over a network, according to various embodiments of the invention. The system 700 includes a number of application providers 710 and a number of end users 730 communicating application data over a network 720. Each of the application providers 710 may communicate with the network through one or more application-side network access points 715 (e.g., a DSLAM, headend, switch, etc.). In the illustrative embodiment, the end users 730 are all shown as customers of a single network resources provider 740 and communicate with the network 720 via a single customer-side network access point 750, which may be controlled by the network resources provider 740. Of course, any number of network resources providers 740 and/or customer-side network access points 750 may be used, according to the invention.

It will be further appreciated that some or all of the application-side network access points 715 and customer-side network access points 750 may be the same network access point. In one example, an application and an intended user access the network via the same network access point. In another example, application data is being communicated via a peer-to-peer, mesh, or other type of network, in which nodes of the network may send, receive, or otherwise communicate information over the network without clear distinctions as to specific access point. For instance, two end users of a network may establish a high-priority peer-to-peer network connection with or without the use of an application provider (or, more precisely, each user may become both an application provider and an intended user for each communication, depending on which user is the sender and which is the receiver of the application data). As such, the phrases "network access point," "customer-side network access point", and "application-side network access point" should not be construed as limiting the scope of the various embodiments and is intended only for clarity of description.

According to the illustrated embodiment, a first application provider 710-1 and a first end user 730-1 are parties to one or more ASLAs 744. The other application providers (710-2-710-n) have no ASLA in place with any of the end users 730. As such, some data traffic over the network 720 will be ASLP data (e.g., at least a portion of the data communicated from the first application provider 710-1 to the first end user 730-1 will include ASLP data), and other data will not be ASLP data. Further, in some embodiments, the network resources provider 740 may be a party to one or more SLAs 742. For example, the network resources provider 740 may have a first SLA 742-1 with the first application provider 710-1, and a second SLA 742-2 with the first end user 730-1. In certain embodiments, the network resources provider 740 may also be a party to the one or more ASLAs 744 between the first application provider 710-1 and the first end user 730-1.

For each end user 710 of network resources, there may be an access network. In some embodiments, the access network includes consumer premises equipment 735 ("CPE") (e.g., a residential gateway, router, modem, femto-cell, etc.) and one or more communication links 770 between the CPE and the customer-side network access point 750. All or part of the communication links 770 may be shared (e.g., as in a cable network) or dedicated (e.g., as in a DSL network). For example, the communication links 770 may include fiber-optics, coaxial cable, CAT-5 cable, CAT-6 cable, twisted-pair cable, wireless links, etc.

Some communication links 770 may be non-ASLP communication links (e.g., 770-2-770-n). These non-ASLP communication links (e.g., 770-2-770-n) may include any type of network link components, protocols, etc. that may be useful for communicating non-ASLP information through the access network. Other communication links 770 may be ASLP communication links (e.g., 770-1). The ASLP communication links (e.g., 770-1) may use network components, protocols, etc. operable to handle ASLP data in the access network. In some embodiments, ASLP handling units 760 are in communication with (or are part of) the CPE 735-1 at the first end user's 730-1 premises and/or at the customer-side network access point 750.

Some illustrative embodiments of ASLP communication links (e.g., 770-1) are shown in FIGS. 8A, 8B, 9A, and 9B. It will be appreciated that, though the embodiments are illustrated with regard to an access network, other implementations are possible according to the invention. For example, similar components and/or functionality may be implemented in a local area network ("LAN"), a home wireless network, a wide area network ("WAN"), etc.

Further, it will be appreciated that various ASLP handling capabilities may be performed at any useful location in a network. For example, ASLP handling functionality may be implemented at equipment in proximity to an end customer, in proximity to an application provider, in proximity to a network switching or routing element, or in any other useful location. In some embodiments, ASLP handling functionality is implemented in an asymmetric DSL ("ADSL") access network, having a dedicated "pipe" between a Digital Subscriber Line Access Multiplexer ("DSLAM") and an end customer's home router and/or DSL modem. Because a typical ADSL access network may allocate larger amounts of bandwidth to uplink channels than to downlink channels, the uplink channels often create many of the bandwidth-related issues for two-way communication applications (e.g., VoIP). In these embodiments, it may be desirable to locate ASLP handling functionality at both the DSLAM side and at the end customer side of the "pipe" to help provide ASLP handling on both the uplink and downlink channels.

Of course, embodiments of the invention may be used with any form of access to a network. For example, embodiments may be used with ADSL, HDSL, SHDSL, VDSL, ADSL2, ADSL2+, VDSL2, bonded xDSL, FTTH, FTTP, FTTC, PON, BPON, GPON, EPON, NGPON, 10GEPON, cable modem access (e.g., through DOCSIS), wireless, etc. In some embodiments (e.g., where the access is not dedicated to a particular user), the access may have to first be partitioned by user and then by application.

In each of FIGS. 8A, 8B, 9A, and 9B, embodiments of communication networks are shown for handling ASLP data, according to various embodiments of the invention. Each communication network includes a first network element 802-1 and a second network element 802-2, in communication via a communication link 770. In some embodiments, the first network element 802-1 is a application-side network access point (e.g., the application-side network access point 715 in FIG. 7) and the second network element 802-2 is a customer-side network access point (e.g., the customer-side network access point 750 of FIG. 7). In other embodiments, the first network element 802-1 and the second network element 802-2 are both elements of a service provider network. In certain embodiments, the service provider network includes elements that are controlled by entities other than the service provider (e.g., where certain contractual relationships are in place). In still other embodiments, the first network element 802-1 and the second network element 802-2 are both elements of an end user's network. For example, the first network element 802-1 may be a router and the second network element 802-2 may be a modem, both located at the end user's home.

Figure 8A:
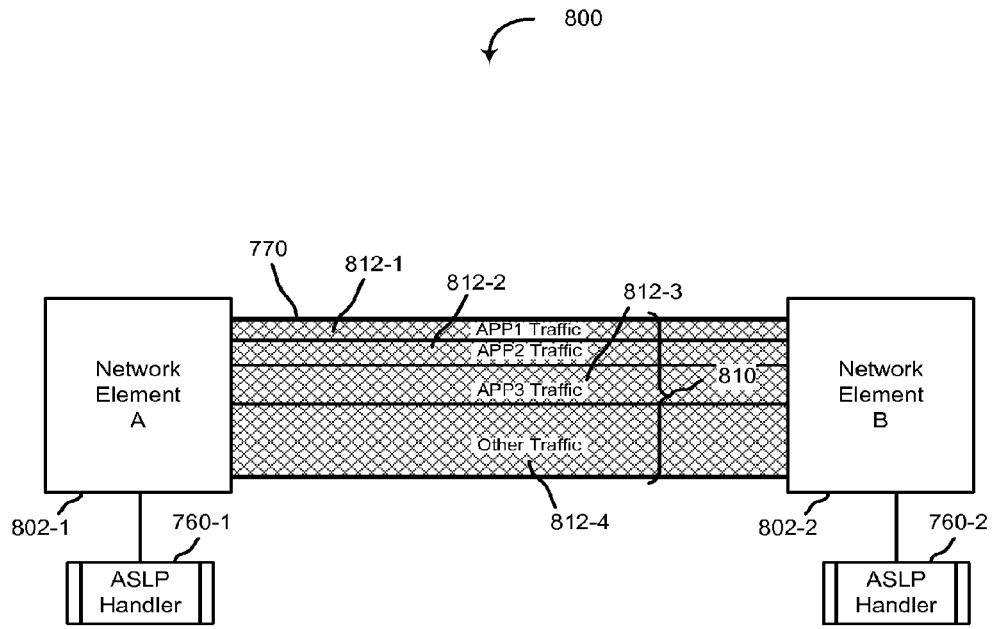
FIG. 8A shows an embodiment of a logically apportioned communication network for handling application service level protocol ("ASLP") data, according to various embodiments of the invention.

Turning to the embodiment of FIG. 8A, a logically apportioned communication network is shown for handling ASLP data, according to various embodiments of the invention. The communication network 800 includes a communication link 770 that is logically apportioned into a number of logical pipes 812. The logical pipes 812 are all configured to communicate ASLP data, thereby collectively making up an apportioned ASLP communication link 810. In some embodiments, one or both of the ASLP handling units 760 configures the ASLP communication link 810 to communicate ASLP data. It will be appreciated that, in some embodiments, the physical transmission medium (e.g., wires or fibers comprising the communication link 810) may be standard mediums, capable of communicating both ASLP and non-ASLP data.

In various embodiments, the ASLP communication link 810 is logically apportioned in one or more ways, as known to those of skill in the art. In the embodiment shown in FIG. 8A, the ASLP communication link 810 is logically apportioned into four logical sub-pipes 812. The first logical sub-pipe 812-1 is configured to communicate application data relating to a first application, the second logical sub-pipe 812-2 is configured to communicate application data relating to a second application, the third logical sub-pipe 812-3 is configured to communicate application data relating to a third application, and the fourth logical sub-pipe 812-4 is configured to communicate all other data traffic on the ASLP communication link 810.

In some embodiments, physically apportioning the ASLP communication link 810 includes creating logical sub-pipes 812 through the use of virtual circuits, backhaul mechanisms, and/or other similar techniques (e.g., to differentiate among data relating to different users, applications, etc.). For example, one or more of the logical sub-pipes 812 may be created using a virtual private network ("VPN") and/or other types of tunneling techniques (e.g., VLAN, VPN inside VLAN, Q-in-Q, etc.), multiple service set identifiers ("SSIDs") and/or other types of spoofing techniques, multiple instances or appearances (e.g., multiple DSL appearances), Ethernet within Ethernet, modulation schemes (e.g., frequency modulation, amplitude modulation, code modulation, color modulation, time modulation, etc.), etc. In other embodiments, physically apportioning the ASLP communication link 810 includes creating logical sub-pipes 812 through the use of protocol handling and/or other similar techniques (e.g., to differentiate among data relating to different applications). For example, one or more of the logical sub-pipes 812 may be created using different protocols, different QoS profiles within a protocol (e.g., within WiMAX, some application data may be sized for an unsolicited grant service ("UGS") class, while other application data may be sized for real-time packet service ("rtPS"), non-real-time packet service ("nrtPS"), extended real-time packet service ("ErtPS"), best effort ("BE"), and/or other service classes), etc. It is worth noting that certain embodiments may use techniques that do not provide guaranteed bandwidth (e.g., Wi-Fi Multimedia ("WMM"), 802.11e, etc.). It is further worth noting that many different ways may be possible for logically apportioning the ASLP communication link 810 according to embodiments of the invention, including many techniques known in the art relating to layers two through seven of the Open Systems Interconnection Basic Reference Model ("OSI Model").

Figure 8B:
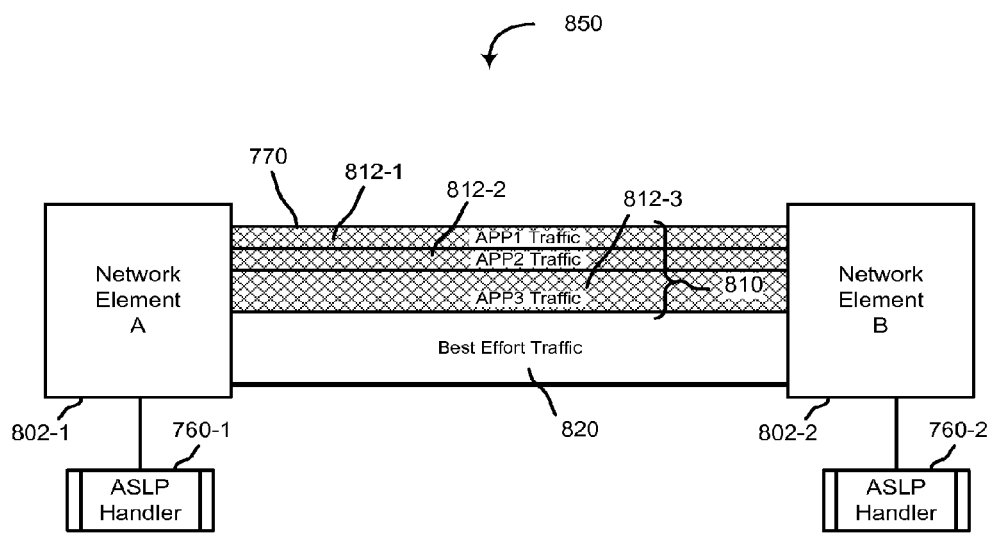
FIG. 8B shows another embodiment of a logically apportioned communication network for handling ASLP data, according to various embodiments of the invention.

FIG. 8B shows another embodiment of a logically apportioned communication network for handling ASLP data, according to various embodiments of the invention. Embodiments of the communication network 850 may be similar to the communication network 800 shown in FIG. 8A. However, as shown, the communication link 770 is logically apportioned into an ASLP communication link 810 and a non-ASLP communication link 820. In some embodiments, the ASLP communication link 810 is further logically apportioned (e.g., as in FIG. 8A) into logical sub-pipes 812. While the illustrative embodiment is shown with three logical sub-pipes 812 in the ASLP communication link 810 and a single non-ASLP communication link 820 for best-effort traffic, it will be appreciated that many numbers and/or types of configurations are possible according to the invention.

Figure 9A:
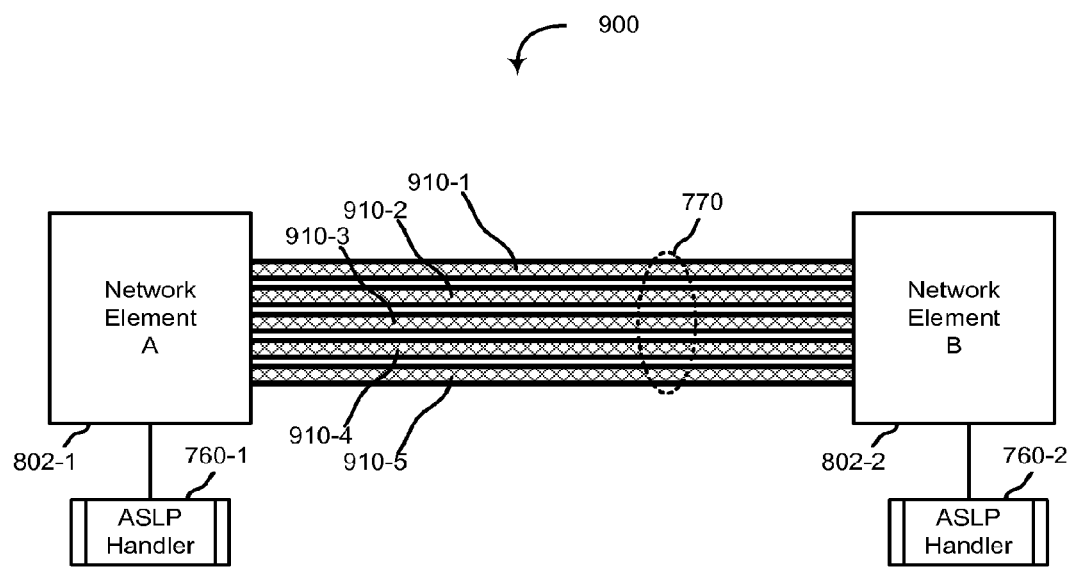
FIG. 9A shows an embodiment of a physically apportioned communication network for handling ASLP data, according to various embodiments of the invention.

FIG. 9A shows an embodiment of a physically apportioned communication network for handling ASLP data, according to various embodiments of the invention. Embodiments of the communication network 900 may be similar to the communication network 800 shown in FIG. 8A. However, as shown, the communication link 770 is physically apportioned into five separate ASLP communication sub-links 910. In some embodiments, one or more of the ASLP communication sub-links 910 are further logically apportioned (e.g., as in FIG. 8A) into logical sub-pipes 812.

While the illustrative embodiment is shown with five physical ASLP communication sub-links 910 in the communication link 770, it will be appreciated that many numbers and/or types of configurations are possible according to the invention. It will be further appreciated that each of the physical ASLP communication sub-links 910 may use the same or different communications mediums. For example, some physical ASLP communication sub-links 910 may be wired, while others are wireless; some physical ASLP communication sub-links 910 may communicate information electrically, while others communicate information optically; some physical ASLP communication sub-links 910 may communicate information with low bandwidth, while others communicate information with high bandwidth; some physical ASLP communication sub-links 910 may include singular transmission mediums, while others include parallel (e.g., bundled) transmission mediums; some ASLP communication sub-links include combinations of access media; etc. It will be even further appreciated that physically apportioned sub-links may be physically and/or logically bundled. For example, multiple wired links may be run through a single trunk, conduit, or other secondary medium.

Figure 9B:
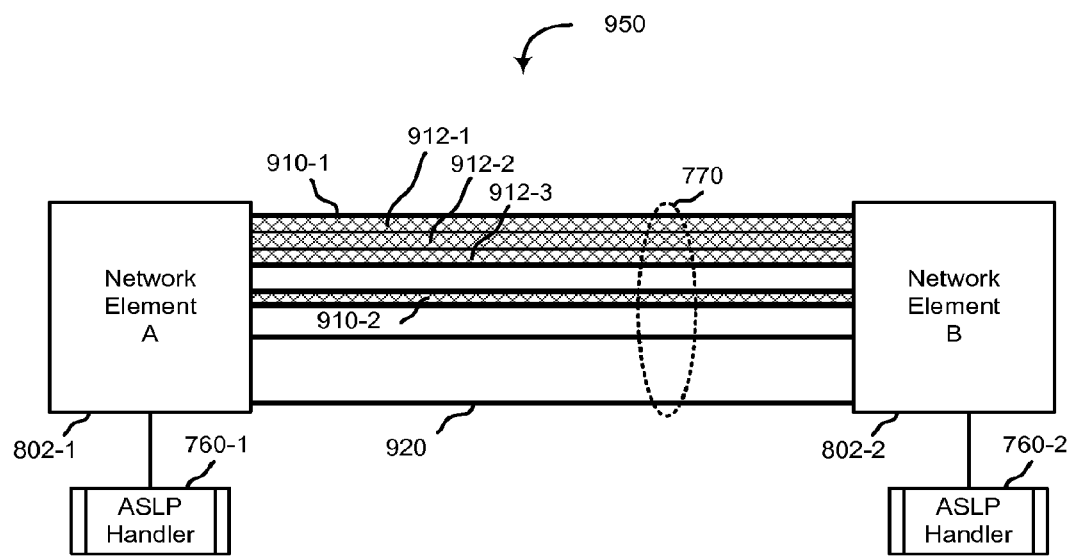
FIG. 9B shows an embodiment of a hybrid (logically and physically apportioned) communication link for handling both ASLP data and non-ASLP data, according to various embodiments of the invention.

FIG. 9B shows an embodiment of a hybrid (logically and physically apportioned) communication link for handling both ASLP data and non-ASLP data, according to various embodiments of the invention. Embodiments of the communication network 950 may be similar to the communication network 800 shown in FIG. 8A. However, as shown, the communication link 770 is logically apportioned into two ASLP communication links (910-1 and 910-2) and a non-ASLP communication link 920. In some embodiments, the first ASLP communication link 910-1 is further logically apportioned (e.g., as in FIG. 8A) into logical sub-pipes 912. While the illustrative embodiment is shown with three logical sub-pipes 912 in the first ASLP communication link 910-1, a single non-apportioned second ASLP communication link 910-2, and a single non-ASLP communication link 920 for other traffic, it will be appreciated that many numbers and/or types of configurations are possible according to the invention.

In one illustrative embodiment, a customer access network is provided to look like the communication network 950. The communication network 950 is configured such that data relating to a certain registered and authenticated application with the highest priority (e.g., according to certain service level settings, time of day, etc.) is communicated over the second ASLP communication link 910-2, operable to provide large amounts of dedicated and guaranteed bandwidth over the customer's access network. Data relating to a certain other registered and authenticated applications with lower priorities are communicated over the various logical sub-pipes 912 of the first ASLP communication link 910-1. Other network traffic (e.g., non-ASLP data, data relating to unregistered or unauthenticated applications, according to service level settings, etc.) is sent as best effort traffic over the non-ASLP communication link 920.

As shown in each of FIGS. 8A, 8B, 9A, and 9B, some embodiments of the communication networks (e.g., 800, 850, 900, or 950) include a first ASLP handling unit 760-1 in communication with (or is part of) the first network element 802-1. The first ASLP handling unit 760-1 may be configured to interpret ASLP data being communicated over the network, and to determine how the ASLP data should be handled. For example, the first ASLP handling unit 760-1 may determine how to route, prioritize, block, and otherwise handle data destined for the second network element 802-2, based wholly or partially on service level settings relating to the second network element 802-2. In certain other embodiments, a second ASLP handling unit 760-2 is in communication with (or is part of) the second network element 802-2. In various embodiments, the ASLP handling units 760 may be configured with the same or different functionality. Embodiments of ASLP handling units 760 are discussed further with regard to FIGS. 10-12.

Figure 10:
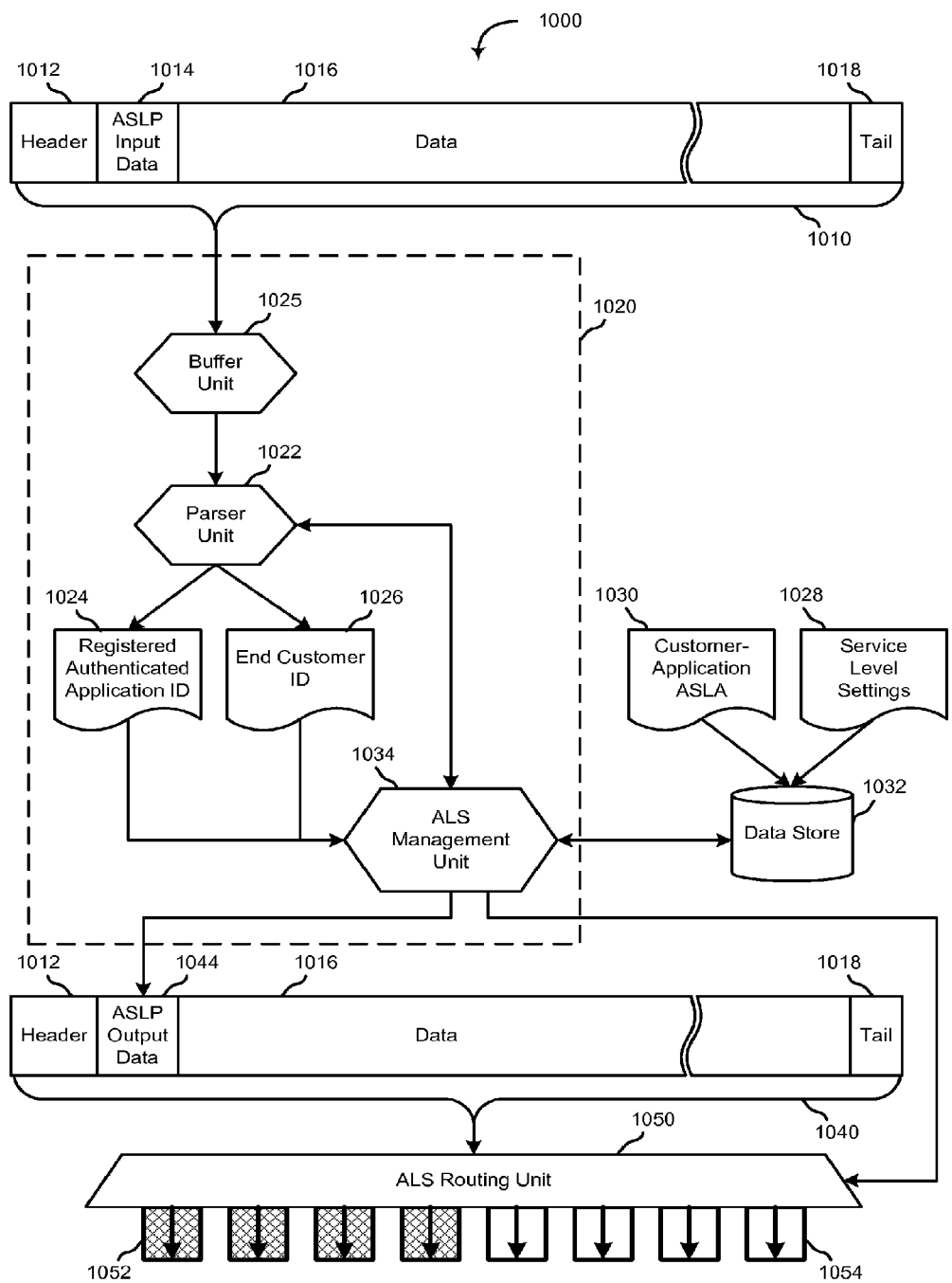
FIG. 10 shows an illustrative data flow diagram for an ASLP handling unit, according to various embodiments of the invention.

FIG. 10 shows an illustrative data flow diagram for an ASLP handling unit, according to various embodiments of the invention. The data flow 1000 includes an input data packet 1010, an ASLP handling unit 1020, an output data packet 1040, and an ALS routing unit 1050. The ASLP handling unit 1020 is configured to receive the input data packet 1010 and process it to generate the output data packet 1040.

In certain embodiments where there are multiple ASLP handling units 1020 in a system, each receives the input data packet 1010, interprets the input data packet 1010 against the various agreements and settings concerning the parties to the transmission, and handles the input data packet 1010 accordingly (e.g., including generating the output data packet 1040). In other embodiments where there are multiple ASLP handling units 1020 in a system, the input data packet 1010 may include certain information intended for all ASLP handling units 1020 and other information intended only for a particular subset of ASLP handling units 1020. For example, one part of the ASLP information may indicate to intermediate routers on the network backbone how to handle the data (e.g., a set of bits that define a priority level for the data); and another part of the ASLP information may be decoded only by certain privileged or advanced ASLP handling units 1020 (e.g., the ASLP handling unit 1020 controlled by a network resources provider) to yield information on the identity of an originating application provider and an intended end customer of the application data. In this way, it may be possible to control the amount of access given to various ASLP handling units 1020 (and their controlling entities), for example, to the terms of various ASLAs, to customer account information and service level settings, to information that is proprietary to the network resources provider, etc. Some embodiments of systems including multiple ASLP handling units are described in U.S. application Ser. No. 12/128,841, entitled "APPLICATION LEVELS OF SERVICE OVER A NETWORK", which has been incorporated by reference.

In some embodiments, the input data packet 1010 includes a header portion 1012, an ASLP input bit portion 1014, a data portion 1016, and a tail portion 1018. In certain embodiments, the ASLP input bit portion 1014 is part of the header portion 1012 or the tail portion 1018; while in other embodiments, the ASLP input bit portion 1014 is part of the data portion 1016. It will be appreciated that many other datagram formats are possible for the input data packet 1010, according to the invention. For example, certain data packets may exclusively or primarily include ASLP data, while other data packets may exclusively or primarily include non-ASLP data.

Embodiments of the ASLP handling unit 1020 receive the input data packet 1010 at a buffer unit 1025. The buffer unit 1025 may buffer certain data while other data is being handled. Different buffer units 1025 are known in the art, including data buffers (e.g., last-in first-out ("LIFO"), first-in first-out ("FIFO"), circular, caching, etc.), buffers for interconnecting multiple circuits with different data rates, buffers for correcting timing errors, buffers for grouping data for certain processing (e.g., where groups of binary bits may be operated on as a group), variable length buffers, optical buffers, or any other useful type of buffer.

In some embodiments, all or a portion of the input data packet 1010 is sent to a parser unit 1022. The parser unit 1022 may be operable to parse ASLP information from the input data packet 1010. For example, the parser unit 1022 may extract the bits from the ASLP input bit portion 1014 of the input data packet 1010. In certain embodiments, the parser unit 1022 interprets the ASLP information. For example, the ASLP information may be decoded to yield an originating application provider identifier 1024 and an intended end customer identifier 1026.

In some embodiments, the ASLP information (e.g., in raw or decoded form) may be passed to an ALS management unit 1034. In certain embodiments, the ALS management unit 1034 may control or otherwise affect the operation of the parser unit 1022. In other embodiments, the ALS management unit 1034 is in communication with a data storage unit 1032. The data storage unit 1032 may be configured to store various ASLAs and/or other service level setting information. The ALS management unit 1034 may access information from the data storage unit 1032 that may be relevant to handling the input data packet 1010. For example, the ALS management unit 1034 may access and analyze the ASLA 1030 between the application provider identified by the originating application provider identifier 1024 and the customer identified by the intended end customer identifier 1026, if available. The ALS management unit 1034 may also access and analyze any other relevant service level settings 1028 (e.g., set by the customer, by the application, or set by the network resources provider).

Once the ALS management unit 1034 has sufficient information to determine how to handle the input data packet 1010, the ALS management unit 1034 may make an appropriate network traffic handling determination. In some embodiments, executing the network traffic handling determination may include setting certain parameters physically or logically in the network. For example, certain settings may be affected on a network element local to the ASLP handling unit 1020, remotely on customer premises equipment, etc. In certain of these embodiments, the input data packet 1010 may be routed with no change to its data (e.g., all the ALS-related changes are in the network infrastructure, external to the data itself). As such, the output data packet 1040 may be passed to the network substantially as a copy of the input data packet 1010.

In other embodiments, executing the network traffic handling determination may include generating a set of ASLP output bits. In these embodiments, the output data packet 1040 may be created or modified to include an ASLP output bit portion 1044 for the ASLP output bits. These ASLP output bits may be used, for example, by other network elements or for other reasons.

In some embodiments, the output data packet 1040 may be passed to the ALS routing unit 1050. The ALS routing unit 1050 may determine how to route the output data packet 1040 over one or more physical or logical ASLP communication links 1052 or non-ASLP communication links 1054 (e.g., including any number or configuration of links, sub-links, pipes, sub-pipes, etc. as shown in FIGS. 8A, 8B, 9A, and 9B), or otherwise contribute to executing the network traffic handling determination. In certain embodiments, the network traffic handling determination may be made based on the content or form of the output data packet 1040. For example, the ALS routing unit 1050 may interpret the data or format of the output data packet 1040 to determine how the output data packet 1040 should be routed. In other embodiments, the ALS routing unit 1050 is controlled wholly or partially by the ALS management unit 1034. For example, the ALS routing unit 1050 may route the data based on instructions from the ALS management unit 1034 without interpreting the form or content of the output data packet 1040.

Figure 11:
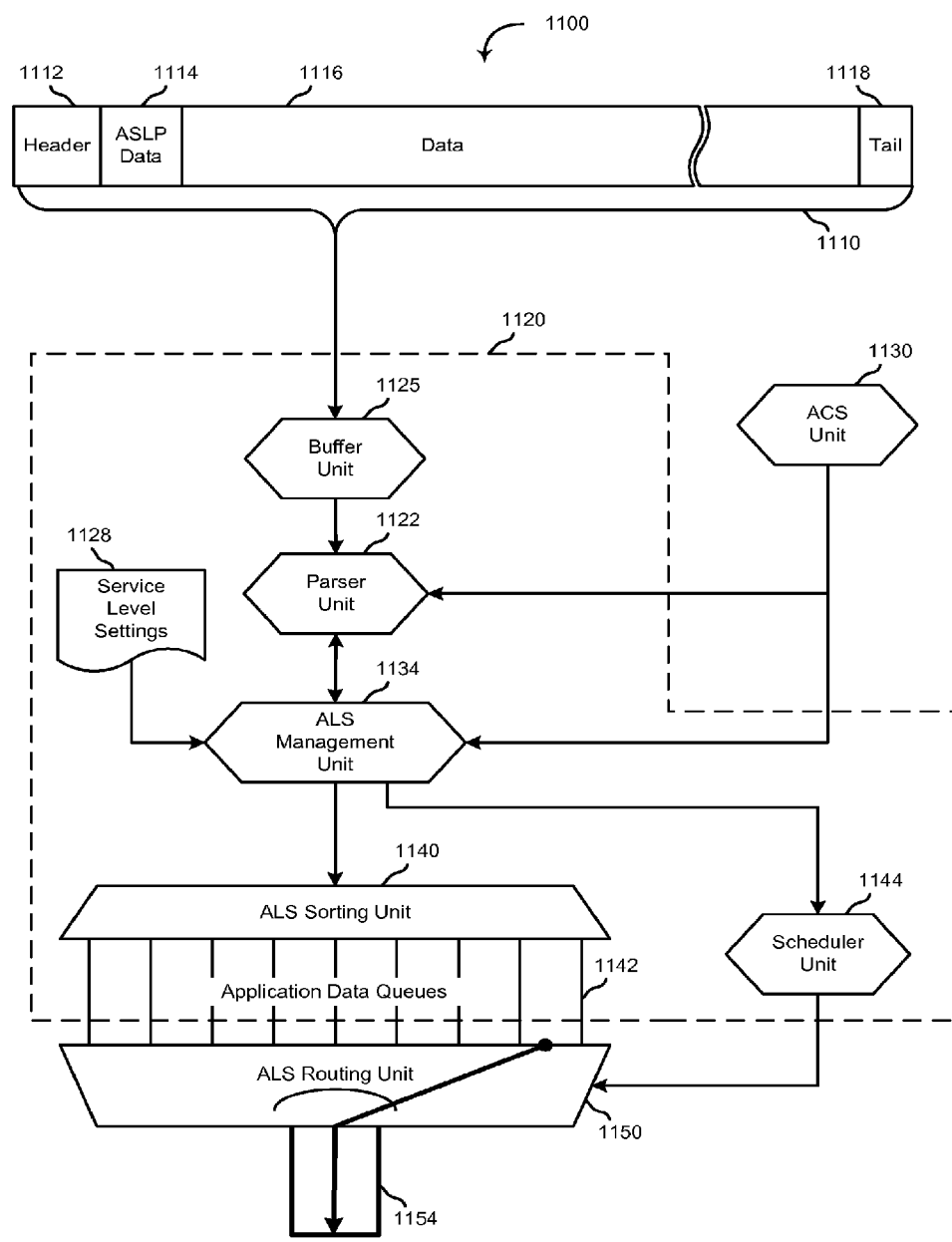
FIG. 11 shows an illustrative data flow diagram for another ASLP handling unit, according to various embodiments of the invention.

FIG. 11 shows an illustrative data flow diagram for another ASLP handling unit, according to various embodiments of the invention. The data flow 1100 includes an ALS data packet 1110, an ASLP handling unit 1120, and an ALS routing unit 1050. The ASLP handling unit 1120 is configured to receive the ALS data packet 1110 and determine how to handle the data at the ALS routing unit 1150. In some embodiments, the ALS data packet 1110 is the same as or similar to the input data packet 1010 of FIG. 10. In other embodiments, the ALS data packet 1110 is the same as or similar to the output data packet 1040 of FIG. 10. For example, the ALS handling unit 1120 may be configured as customer premises equipment and may receive the ALS data packet 1110 from another ALS handling unit, like the ALS handling unit 1020 of FIG. 10. In still other embodiments, the ALS data packet 1110 entirely or primarily includes non-application data for directing the handling of application data by the ALS handling unit 1120. For example, the ALS data packet 1110 may include instructions telling the ALS handling unit 1120 that the subsequent five packets of data should be routed in a particular way.

Embodiments of the ASLP handling unit 1120 receive the ALS data packet 1110 at a buffer unit 1125. In some embodiments, all or a portion of the ALS data packet 1110 is sent to a parser unit 1122. The parser unit 1122 may be operable to parse and/or interpret ASLP information from the ALS data packet 1110.

The ASLP information may be passed to an ALS management unit 1134. In certain embodiments, the ALS management unit 1134 may control or otherwise affect the operation of the parser unit 1122. In some embodiments, the ALS management unit 1134 accesses information, like various service level settings 1128, that may be relevant to handling the parsed data. In other embodiments, the ALS management unit 1134 is in communication with a remote configuration unit 1130. For example, a network resources provider may control service level settings relating to a customer's DSL modem and/or other access CPE using an ACS by transmitting information over the access network (e.g., TR-069 commands). In certain embodiments, the ALS management unit 1134 may control or otherwise affect the operation of the parser unit 1122; while in other embodiments, the remote configuration unit 1130 may control or otherwise affect the operation of the parser unit 1022.

Once the ALS management unit 1134 has sufficient information (e.g., from data sources and/or the remote configuration unit 1130) to determine how to handle the ALS data packet 1110, the ALS management unit 1134 may make an appropriate network traffic handling determination. In some embodiments, executing the network traffic handling determination may include setting certain parameters physically or logically in the network or network element. For example, certain settings may be affected on a network element, on customer premises equipment, etc. In certain of these embodiments, the ALS data packet 1110 may be routed with no change to its data (e.g., all the ALS-related changes are in the network infrastructure, external to the data itself), while other embodiments may modify data as part of handling the data.

In some embodiments, the data is passed to an ALS sorting unit 1140. The ALS sorting unit 1140 may determine (e.g., based on instructions from the ALS management unit 1134) how to sort the data into various application queues 1142. In one embodiment, separate queues are provided for a predetermined number of customer service level settings. For example, four queues may be provided: three for traffic relating to registered authenticated applications with certain preset bandwidth allocations, and a fourth for other (e.g., best effort) traffic. It will be appreciated that many different types of queues are known in the art, including FIFO, LIFO, caching, and other types of queues.

The data may be passed from one or more of the application queues 1142 to the ALS routing unit 1150. The ALS routing unit 1150 may determine how to route the output data packet 1140 over one or more physical or logical communication links 1154 (e.g., ASLP or non-ASLP, including any number or configuration of links, sub-links, pipes, sub-pipes, etc. as shown in FIGS. 8A, 8B, 9A, and 9B), or otherwise contribute to executing the network traffic handling determination.

In certain embodiments, the network traffic handling determination may be made based on the content or form of the output data packet 1140. For example, the ALS routing unit 1150 may interpret the data or format of the output data packet 1140 to determine how the output data packet 1140 should be routed. In other embodiments, the ALS routing unit 1150 is controlled wholly or partially by the ALS management unit 1134. For example, the ALS routing unit 1150 may route the data based on instructions from the ALS management unit 1134 without interpreting the form or content of the output data packet 1140. In still other embodiments, the ALS routing unit 1150 may be wholly or partially controlled by a scheduling unit 1144. The scheduling unit 1144 may be configured to schedule which data is passed to the ALS routing unit 1150 from which application queues 1142, and at which times. These scheduling determinations may help to effectuate some or all of the service level settings relating to the data (e.g., by effectively allocating bandwidth, handling priorities, etc.).

It will be appreciated that the functionality of the various components of the system or the performance of various steps of the methods may be implemented in a number of ways. For example, they may be implemented in hardware, firmware, software, or in any other effective way. Further, they may be implemented as one or more dedicated devices, as one or more components of a larger device, as one or more components of a system, etc. In some embodiments, they are implemented as or in a computational system (e.g., a computer).

Figure 12:
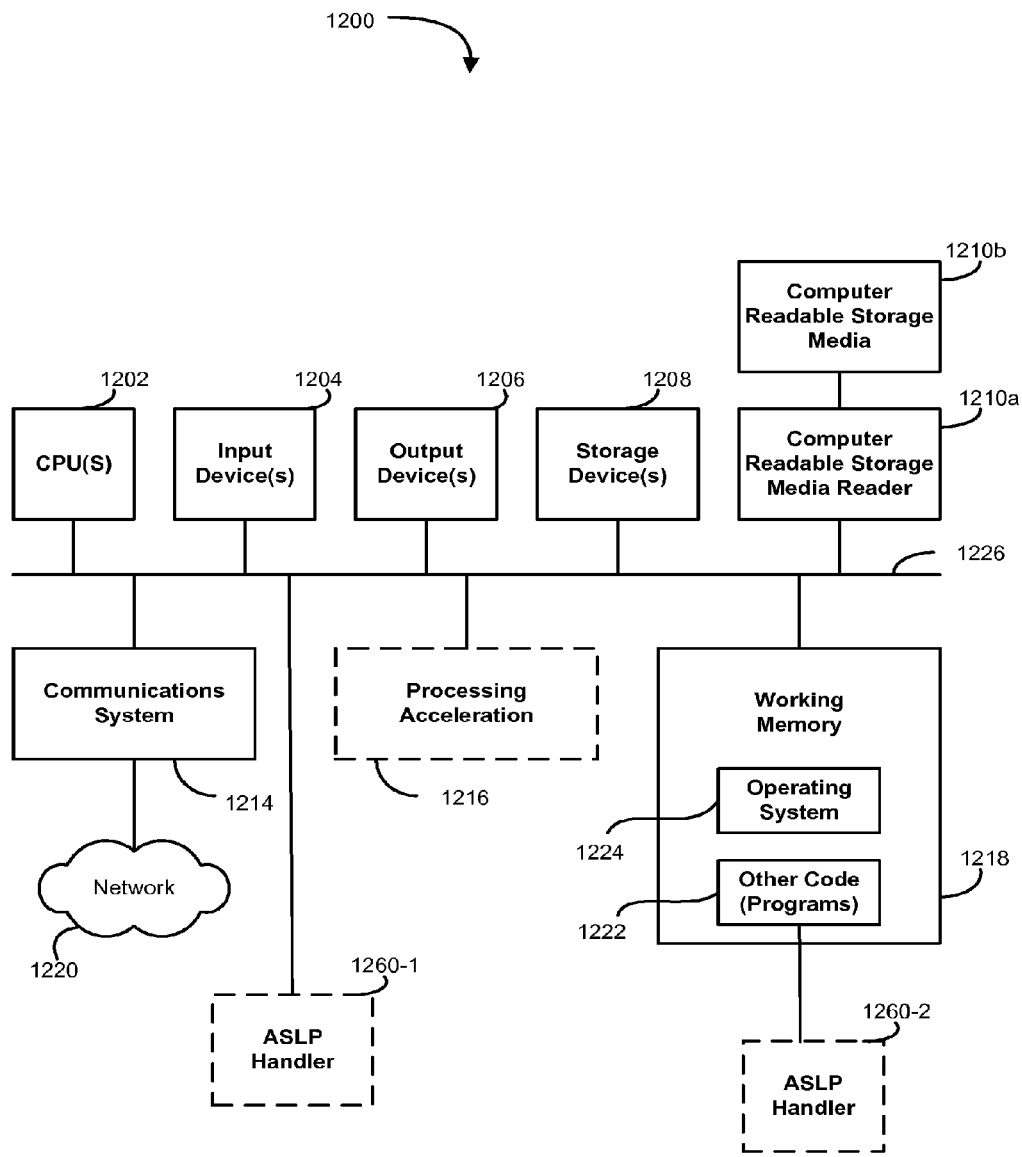
FIG. 12 shows an illustrative computational system for providing ALS support in a network environment, according to various embodiments of the invention.

FIG. 12 shows an illustrative computational system for providing ALS support in a network environment, according to various embodiments of the invention. The computational system 1200 is shown having hardware elements that may be electrically coupled via a bus 1226 (or may otherwise be in communication, as appropriate). The hardware elements may include one or more processors 1202, including without limitation one or more general-purpose processors and/or one or more special-purpose processors (such as digital signal processing chips, graphics acceleration chips, and/or the like); one or more input devices 1204, which can include without limitation a mouse, a keyboard, and/or the like; and one or more output devices 1206, which can include without limitation a display device, a printer, and/or the like. In some embodiments, an ASLP handling unit 1260-1 is coupled to the bus 1226, or is otherwise accessible by other components of the computational system 1200.

The computational system 1200 may further include (and/or be in communication with) one or more storage devices 1208, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like.

The computational system 1200 might also include a communications subsystem 1214, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 1214 may permit data to be exchanged with a network 1220, and/or any other devices described herein. In many embodiments, the computational system 1200 will further comprise a working memory 1218, which can include a RAM or ROM device, as described above.

The computational system 1200 also may include software elements, shown as being currently located within the working memory 1218, including an operating system 1224 and/or other code, such as one or more application programs 1222, which may include computer programs of the invention, and/or may be designed to implement methods of the invention and/or configure systems of the invention, as described herein. For example, the application programs 1222 may include functionality to implement some or all of the aspects of an ASLP handling unit 1260-2.

Merely by way of example, one or more procedures described with respect to the method(s) discussed above might be implemented as code and/or instructions executable by a computer (and/or a processor within a computer). A set of these instructions and/or code might be stored on a computer readable storage medium 1210b. In some embodiments, the computer readable storage medium 1210b is the storage device(s) 1208 described above. In other embodiments, the computer readable storage medium 1210b might be incorporated within a computational system, such as the system 1200. In still other embodiments, the computer readable storage medium 1210b might be separate from the computational system (i.e., a removable medium, such as a compact disc, etc.), and/or provided in an installation package, such that the storage medium can be used to configure a general purpose computer with the instructions/code stored thereon. These instructions might take the form of executable code, which is executable by the computational system 1200 and/or might take the form of source and/or installable code, which, upon compilation and/or installation on the computational system 1200 (e.g., using any of a variety of generally available compilers, installation programs, compression/decompression utilities, etc.), then takes the form of executable code. In these embodiments, the computer readable storage medium 1210b may be read by a computer readable storage media reader 1210a.

In one embodiment, the invention employs the computational system to perform methods of the invention. According to a set of embodiments, some or all of the procedures of such methods are performed by the computational system 1200 in response to processor 1202 executing one or more sequences of one or more instructions (which might be incorporated into the operating system 1224 and/or other code, such as an application program 1222) contained in the working memory 1218. Such instructions may be read into the working memory 1218 from another machine-readable medium, such as one or more of the storage device(s) 1208 (or 1210). Merely by way of example, execution of the sequences of instructions contained in the working memory 1218 might cause the processor(s) 1202 to perform one or more procedures of the methods described herein. In this way, the computational system 1200 can be "configured to" or "operable to" perform any number of such procedures or methods.

The terms "machine readable medium" and "computer readable medium," as used herein, refer to any medium that participates in providing data that causes a machine to operate in a specific fashion. In an embodiment implemented using the computational system 1200, various machine-readable media might be involved in providing instructions/code to processor(s) 1202 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (1208 or 1210). Volatile media includes, without limitation dynamic memory, such as the working memory 1218. Transmission media includes coaxial cables, copper wire, and fiber optics, including the wires that comprise the bus 1226, as well as the various components of the communication subsystem 1214 (and/or the media by which the communications subsystem 1214 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1202 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 1200. These signals, which might be in the form of electromagnetic signals, acoustic signals, optical signals, and/or the like, are all examples of carrier waves on which instructions can be encoded, in accordance with various embodiments of the invention.

The communications subsystem 1214 (and/or components thereof) generally may receive the signals, and the bus 1226 then may carry the signals (and/or the data, instructions, etc. carried by the signals) to the working memory 1218, from which the processor(s) 1202 may retrieve and execute the instructions. The instructions received by the working memory 1218 may optionally be stored on a storage device 1208 either before or after execution by the processor(s) 1202.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A communication network for providing an application level of service, the network comprising:
    a first network element;
    a second network element;
    a communication link operable to provide a communicative coupling between the first network element and the second network element, the communicative coupling comprising an allocatable bandwidth configured to permit allocation of bandwidth resources as a function of a set of service level settings relating to at least a portion of a plurality of applications.

2. The network of claim 1, wherein:
    network traffic being communicated over the communication link comprises a first portion relating to a first application and a second portion relating to a second application,
    the allocatable bandwidth is configured to be allocated into at least a first communication sub-link and a second communication sub-link,
    the first communication sub-link is configured to carry the first portion of the network traffic relating to the first application, and
    the second communication sub-link is configured to carry the second portion of the network traffic relating to the second application.

3. The network of claim 2, wherein at least one of the first communication sub-link or the second communication sub-link comprises a logical division of the communication link.

4. The network of claim 2, wherein at least one of the first communication sub-link or the second communication sub-link comprises a physical division of the communication link.

5. The network of claim 4, wherein the physical division comprises a logical division of the communication sub-link.

6. The network of claim 1, wherein a portion of the allocatable bandwidth is configured to carry best effort network traffic.

7. The network of claim 1, wherein the communication link comprises a total capacity, the total capacity comprising the allocatable bandwidth and a remaining bandwidth, the remaining bandwidth being configured not to be allocatable.

8. The network of claim 7, wherein the remaining bandwidth is configured to carry best effort network traffic.

9. The network of claim 1, wherein at least a portion of the communication link is wireless.

10. The network of claim 1, wherein the network comprises shared network resources and the shared resources comprise the communication link.

11. A method of providing an application level of service, the method comprising:
    providing, in a communication network, a first network element;
    providing, in the communication network, a second network element; and
    providing, with a communication link, a communicative coupling between the first network element and the second network element, the communicative coupling comprising an allocatable bandwidth configured to permit allocation of bandwidth resources as a function of a set of service level settings relating to at least a portion of a plurality of applications.

12. The method of claim 11, wherein network traffic being communicated over the communication link comprises a first portion relating to a first application and a second portion relating to a second application, the method further comprising:
- allocating the allocatable bandwidth into at least a first communication sub-link and a second communication sub-link;
- carrying, with the first communication sub-link, the first portion of the network traffic relating to the first application; and
- carrying, with the second communication sub-link the second portion of the network traffic relating to the second application.

13. The method of claim 12, wherein at least one of the first communication sub-link or the second communication sub-link comprises a logical division of the communication link.

14. The method of claim 12, wherein at least one of the first communication sub-link or the second communication sub-link comprises a physical division of the communication link.

15. The method of claim 14, wherein the physical division comprises a logical division of the communication sub-link.

16. The method of claim 11, wherein a portion of the allocatable bandwidth is configured to carry best effort network traffic.

17. The method of claim 11, wherein the communication link comprises a total capacity, the total capacity comprising the allocatable bandwidth and a remaining bandwidth, the remaining bandwidth being configured not to be allocatable.

18. The method of claim 17, wherein the remaining bandwidth is configured to carry best effort network traffic.

19. The method of claim 11, wherein at least a portion of the communication link is wireless.

20. The method of claim 11, wherein the network comprises shared network resources and the shared resources comprise the communication link.

* * * * *